US011212051B2

(12) United States Patent
Bhattad et al.

(10) Patent No.: US 11,212,051 B2
(45) Date of Patent: Dec. 28, 2021

(54) BEAM MANAGEMENT FOR AUTONOMOUS UPLINK WITH ANALOG BEAMS

(71) Applicant: QUALCOMM Incorporated, San Diego, CA (US)

(72) Inventors: Kapil Bhattad, Bangalore (IN); Jing Sun, San Diego, CA (US); Xiaoxia Zhang, San Diego, CA (US); Srinivas Yerramalli, San Diego, CA (US); Tamer Kadous, San Diego, CA (US); Yongbin Wei, La Jolla, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 16/292,293

(22) Filed: Mar. 4, 2019

(65) Prior Publication Data

US 2019/0280836 A1 Sep. 12, 2019

Related U.S. Application Data

(60) Provisional application No. 62/639,150, filed on Mar. 6, 2018.

(51) Int. Cl.
*H04L 5/00* (2006.01)
*H04W 74/08* (2009.01)
(Continued)

(52) U.S. Cl.
CPC ......... *H04L 5/0048* (2013.01); *H04B 7/0695* (2013.01); *H04B 7/088* (2013.01);
(Continued)

(58) Field of Classification Search
CPC ..... H04L 5/0048; H04B 7/0695; H04B 7/088; H04W 24/10
See application file for complete search history.

(56) References Cited

U.S. PATENT DOCUMENTS

2011/0009116 A1* 1/2011 Moberg ............ H04W 36/0088
455/425
2011/0294532 A1* 12/2011 Ambrosy ............ H04W 24/02
455/517
(Continued)

FOREIGN PATENT DOCUMENTS

WO WO-2017196612 A1 11/2017

OTHER PUBLICATIONS

International Search Report and Written Opinion—PCT/US2019/020791—ISA/EPO—dated May 6, 2019.
(Continued)

*Primary Examiner* — Kevin M Cunningham
(74) *Attorney, Agent, or Firm* — QUALCOMM Incorporated

(57) ABSTRACT

Beam-specific autonomous uplink (AUL) resources may be configured with an associated reference signal for beam management. For example, a base station may configure respective sets of AUL resources that are specific to one or more base station receive beams. These sets of beam-specific AUL resources may be configured to be associated (e.g., quasi co-located (QCL)) with a reference signal, such as a channel state information reference signal (CSI-RS), a synchronization signal burst (SSB), or the like. The base station may periodically transmit the reference signals that are associated with the AUL resources. A user equipment (UE), upon detecting one or more of the reference signals, may identify which set of AUL resources are available for an AUL transmission of uplink data. In such cases, the UE may select a set of AUL resources based on a signal strength of the reference signal associated with that set of AUL resources.

26 Claims, 18 Drawing Sheets

(51) Int. Cl.
*H04W 24/10* (2009.01)
*H04W 72/14* (2009.01)
*H04W 56/00* (2009.01)
*H04B 7/08* (2006.01)
*H04B 7/06* (2006.01)

(52) U.S. Cl.
CPC ......... *H04W 24/10* (2013.01); *H04W 56/001* (2013.01); *H04W 72/14* (2013.01); *H04W 74/0833* (2013.01); *H04B 7/0632* (2013.01)

(56) References Cited

U.S. PATENT DOCUMENTS

| | | | | |
|---|---|---|---|---|
| 2012/0165064 A1* | 6/2012 | Koutsimanis | ......... | H04W 8/186 455/524 |
| 2013/0244572 A1* | 9/2013 | Angeletti | ........... | H04B 7/18513 455/12.1 |
| 2014/0106738 A1* | 4/2014 | Ostrup | ................. | H04W 24/02 455/422.1 |
| 2015/0382205 A1* | 12/2015 | Lee | ...................... | H04B 7/0617 370/329 |
| 2017/0288817 A1* | 10/2017 | Cao | ........................ | H04L 1/1812 |
| 2018/0279284 A1* | 9/2018 | Wang | .................... | H04L 5/0048 |
| 2018/0288746 A1* | 10/2018 | Zhang | .................. | H04L 1/0031 |
| 2019/0141552 A1* | 5/2019 | Chen | ....................... | H04W 24/08 |
| 2019/0173645 A1* | 6/2019 | Guo | ....................... | H04L 5/0007 |
| 2020/0021388 A1* | 1/2020 | Lyu | .................. | H04W 72/0406 |

OTHER PUBLICATIONS

Samsung: "NR Details of Beam Recovery Procedure", 3GPP Draft; R2-1711719_NR Details of Beam Recovery Procedure, 3rd Generation Partnership Project (3GPP), Mobile Competence Centre, 650, Route Des Lucioles, F-06921 Sophia-Antipolis Cedex, France, vol. RAN WG2. No. Prague, Czech; Oct. 9, 2017-Oct. 13, 2017, Oct. 8, 2017(Oct. 8, 2017), 4 Pages, XP051343677, Retrieved from the Internet: URL: https://www.3gpp.org/ftp/Meetings_3GPP_SYNC/RAN2/Docs/[retrieved on Oct. 8, 2017].

* cited by examiner

BEAM MANAGEMENT FOR AUTONOMOUS UPLINK WITH ANALOG BEAMS

CROSS REFERENCES

The present Application for Patent claims the benefit of U.S. Provisional Patent Application No. 62/639,150 by BHATTAD, et al., entitled "BEAM MANAGEMENT FOR AUTONOMOUS UPLINK WITH ANALOG BEAMS," filed Mar. 6, 2018, assigned to the assignee hereof, and expressly incorporated herein.

BACKGROUND

The following relates generally to wireless communication and to beam management for autonomous uplink (AUL) with analog beams.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, wireless devices (e.g., base stations, UEs, etc.) may communicate using directional transmissions (e.g., beams), in which beamforming techniques may be applied using one or more antenna elements to form a beam in a particular direction. Directional transmissions and beam management may be used in AUL transmissions.

SUMMARY

The described techniques relate to improved methods, systems, devices, or apparatuses that support beam management for autonomous uplink (AUL) with analog beams. Generally, the described techniques provide for the configuration of beam-specific AUL resources with an associated reference signal for efficient beam management. For example, a base station may configure respective sets of AUL resources that are specific to one or more base station receive beams. These sets of beam-specific AUL resources may be configured to be associated (e.g., quasi co-located (QCL)) with a reference signal, such as a channel state information reference signal (CSI-RS), a synchronization signal burst (SSB), or the like. The base station may periodically transmit the reference signals that are associated with the AUL resources and a user equipment (UE), upon detecting one or more of the reference signals, may identify which set of AUL resources are available for an AUL transmission of uplink data. In such cases, the UE may select a set of AUL resources based on a signal strength of the reference signal associated with that set of AUL resources. Additionally, the UE may determine that a reference signal previously having the highest signal strength has gone missing (e.g., the signal strength of the reference signal has fallen below a threshold), and may select another reference signal that is associated with a different set of beam-specific AUL resources. The UE may thus perform subsequent AUL transmissions using the different set of beam-specific AUL resources. The presence of the reference signals associated with respective sets of AUL resources may enable UEs to coherently and continuously monitor for available AUL resources configured by the base station. Such beam management techniques may ensure the UE is able to perform AUL transmissions when different beams are utilized for AUL, such as when the UE is mobile and at various positions relative to the base station over time. Likewise, the base station may configure (and reconfigure) AUL resources to account for the UEs mobility.

A method of wireless communication is described. The method may include receiving, from a base station, an AUL configuration comprising an indication of multiple sets of AUL resources for the UE, wherein each set of AUL resources of the multiple sets of AUL resources is specific to a respective AUL receive beam of the base station and is associated with a reference signal, receiving multiple reference signals associated with the multiple sets of beam-specific AUL resources from the base station, selecting a first set of beam-specific AUL resources from the multiple sets of beam-specific AUL resources based at least in part on a signal strength of a first reference signal of the multiple reference signals, and performing an AUL transmission of uplink data to the base station using the selected first set of beam-specific AUL resources.

An apparatus for wireless communication is described. The apparatus may include means for receiving, from a base station, an AUL configuration comprising an indication of multiple sets of AUL resources for the UE, wherein each set of AUL resources of the multiple sets of AUL resources is specific to a respective AUL receive beam of the base station and is associated with a reference signal, means for receiving multiple reference signals associated with the multiple sets of beam-specific AUL resources from the base station, means for selecting a first set of beam-specific AUL resources from the multiple sets of beam-specific AUL resources based at least in part on a signal strength of a first reference signal of the multiple reference signals, and means for performing an AUL transmission of uplink data to the base station using the selected first set of beam-specific AUL resources.

Another apparatus for wireless communication is described. The apparatus may include a processor, memory in electronic communication with the processor, and instructions stored in the memory. The instructions may be operable to cause the processor to receive, from a base station, an AUL configuration comprising an indication of multiple sets of AUL resources for the UE, wherein each set of AUL resources of the multiple sets of AUL resources is specific to a respective AUL receive beam of the base station and is associated with a reference signal, receive multiple reference signals associated with the multiple sets of beam-specific AUL resources from the base station, select a first set of beam-specific AUL resources from the multiple sets of beam-specific AUL resources based at least in part on a signal strength of a first reference signal of the multiple reference signals, and perform an AUL transmission of uplink data to the base station using the selected first set of beam-specific AUL resources.

A non-transitory computer-readable medium for wireless communication is described. The non-transitory computer-readable medium may include instructions operable to cause a processor to receive, from a base station, an AUL configuration comprising an indication of multiple sets of AUL resources for the UE, wherein each set of AUL resources of the multiple sets of AUL resources is specific to a respective AUL receive beam of the base station and is associated with a reference signal, receive multiple reference signals associated with the multiple sets of beam-specific AUL resources from the base station, select a first set of beam-specific AUL resources from the multiple sets of beam-specific AUL resources based at least in part on a signal strength of a first reference signal of the multiple reference signals, and perform an AUL transmission of uplink data to the base station using the selected first set of beam-specific AUL resources.

Some examples of the method, apparatus, and non-transitory computer-readable medium described above may further include processes, features, means, or instructions for determining that subsequent transmissions of the first reference signal may have become undetectable based at least in part on the signal strength of the first reference signal. Some examples of the method, apparatus, and non-transitory computer-readable medium described above may further include processes, features, means, or instructions for selecting a second set of beam-specific AUL resources from the multiple sets of beam-specific AUL resources based at least in part on a signal strength of a second reference signal of the multiple reference signals. Some examples of the method, apparatus, and non-transitory computer-readable medium described above may further include processes, features, means, or instructions for performing a second AUL transmission of uplink data to the base station using the selected second set of beam-specific AUL resources.

Some examples of the method, apparatus, and non-transitory computer-readable medium described above may further include processes, features, means, or instructions for determining that subsequent transmissions of the multiple reference signals may have become undetectable based at least in part on a signal strength of each reference signal of the multiple reference signals. Some examples of the method, apparatus, and non-transitory computer-readable medium described above may further include processes, features, means, or instructions for transmitting a request message to the base station to configure communications resources for a set of base station receive beams.

In some examples of the method, apparatus, and non-transitory computer-readable medium described above, the request message comprises a random access channel (RACH) message. Some examples of the method, apparatus, and non-transitory computer-readable medium described above may further include processes, features, means, or instructions for comparing a signal strength of the first reference signal with a signal strength of a second reference signal of the multiple reference signals, wherein selecting the first set of beam-specific AUL resources may be based at least in part on the comparison. In some examples of the method, apparatus, and non-transitory computer-readable medium described above, receiving the multiple reference signals comprises receiving the multiple reference signals in accordance with a periodicity.

Some examples of the method, apparatus, and non-transitory computer-readable medium described above may further include processes, features, means, or instructions for measuring a signal strength of the multiple reference signals. Some examples of the method, apparatus, and non-transitory computer-readable medium described above may further include processes, features, means, or instructions for transmitting, to the base station, a measurement report comprising information obtained from the measurements of the multiple reference signals, wherein the measurement report may be transmitted using a set of beam-specific resources that may be different from the selected first set of beam-specific AUL resources.

In some examples of the method, apparatus, and non-transitory computer-readable medium described above, the measurement report may be transmitted upon determining that a signal strength of the first reference signal no longer satisfies a threshold. In some examples of the method, apparatus, and non-transitory computer-readable medium described above, the measurement report may be transmitted upon determining that a signal strength of a second reference signal becomes larger than the signal strength of the first reference signal by a threshold amount. In some examples of the method, apparatus, and non-transitory computer-readable medium described above, the set of beam-specific resources may be scheduled by a resource grant received from the base station.

Some examples of the method, apparatus, and non-transitory computer-readable medium described above may further include processes, features, means, or instructions for selecting a second set of beam-specific AUL resources from the multiple sets of beam-specific AUL resources based at least in part on a signal strength of a second reference signal of the multiple reference signals. In some examples of the method, apparatus, and non-transitory computer-readable medium described above, performing the AUL transmission of the uplink data includes performing the AUL transmission of the uplink data using the selected first set of beam-specific AUL resources and the selected second set of beam-specific AUL resources.

In some examples of the method, apparatus, and non-transitory computer-readable medium described above, selecting the first set of beam-specific AUL resources comprises determining that the signal strength of the first reference signal satisfies a threshold. Some examples of the method, apparatus, and non-transitory computer-readable medium described above may further include processes, features, means, or instructions for selecting the first set of beam-specific AUL resources based at least in part on the determination that the signal strength of the first reference signal satisfies the threshold.

In some examples of the method, apparatus, and non-transitory computer-readable medium described above, the multiple sets of beam-specific AUL resources may be configured for a majority of receive beams of the base station. In some examples of the method, apparatus, and non-transitory computer-readable medium described above, the multiple sets of beam-specific AUL resources may be configured for a subset of receive beams selected from a majority of receive beams of the base station. In some examples of the method, apparatus, and non-transitory computer-readable medium described above, a number of resources in each set of beam-specific AUL resources may be proportional to a traffic load on a corresponding AUL receive beam of the base station.

In some examples of the method, apparatus, and non-transitory computer-readable medium described above, each of the multiple reference signals comprise a channel state information reference signal (CSI-RS), or a synchronization signal burst (SSB), or a combination thereof. A method of wireless communication is described. The method may include identifying multiple sets of AUL resources for a UE, determining an AUL configuration for the multiple sets of AUL resources and multiple AUL receive beams of the base station, wherein each of the multiple sets of AUL resources is specific to a respective AUL receive beam of the base station and is associated with a reference signal, transmitting multiple reference signals associated with the multiple sets of beam-specific AUL resources to the UE, and receiving an AUL transmission from the UE based at least in part on the multiple reference signals, wherein the AUL transmission is received using a first set of beam-specific AUL resources from the multiple sets of AUL resources.

An apparatus for wireless communication is described. The apparatus may include means for identifying multiple sets of AUL resources for a UE, means for determining an AUL configuration for the multiple sets of AUL resources and multiple AUL receive beams of the base station, wherein each of the multiple sets of AUL resources is specific to a respective AUL receive beam of the base station and is associated with a reference signal, means for transmitting multiple reference signals associated with the multiple sets of beam-specific AUL resources to the UE, and means for receiving an AUL transmission from the UE based at least in part on the multiple reference signals, wherein the AUL transmission is received using a first set of beam-specific AUL resources from the multiple sets of AUL resources.

Another apparatus for wireless communication is described. The apparatus may include a processor, memory in electronic communication with the processor, and instructions stored in the memory. The instructions may be operable to cause the processor to identify multiple sets of AUL resources for a UE, determine an AUL configuration for the multiple sets of AUL resources and multiple AUL receive beams of the base station, wherein each of the multiple sets of AUL resources is specific to a respective AUL receive beam of the base station and is associated with a reference signal, transmit multiple reference signals associated with the multiple sets of beam-specific AUL resources to the UE, and receive an AUL transmission from the UE based at least in part on the multiple reference signals, wherein the AUL transmission is received using a first set of beam-specific AUL resources from the multiple sets of AUL resources.

A non-transitory computer-readable medium for wireless communication is described. The non-transitory computer-readable medium may include instructions operable to cause a processor to identify multiple sets of AUL resources for a UE, determine an AUL configuration for the multiple sets of AUL resources and multiple AUL receive beams of the base station, wherein each of the multiple sets of AUL resources is specific to a respective AUL receive beam of the base station and is associated with a reference signal, transmit multiple reference signals associated with the multiple sets of beam-specific AUL resources to the UE, and receive an AUL transmission from the UE based at least in part on the multiple reference signals, wherein the AUL transmission is received using a first set of beam-specific AUL resources from the multiple sets of AUL resources.

Some examples of the method, apparatus, and non-transitory computer-readable medium described above may further include processes, features, means, or instructions for receiving, from the UE, a second AUL transmission using a second set of beam-specific AUL resources from the multiple sets of AUL resources based at least in part on subsequent transmissions of the multiple reference signals.

Some examples of the method, apparatus, and non-transitory computer-readable medium described above may further include processes, features, means, or instructions for receiving a request message from the UE based at least in part on subsequent transmissions of each of the multiple reference signals becoming undetectable by the UE. Some examples of the method, apparatus, and non-transitory computer-readable medium described above may further include processes, features, means, or instructions for configuring, in response to the request message, communications resources and a set of receive beams for communicating with the UE.

In some examples of the method, apparatus, and non-transitory computer-readable medium described above, the request message comprises a RACH message. In some examples of the method, apparatus, and non-transitory computer-readable medium described above, transmitting the multiple reference signals to the UE comprises transmitting the multiple reference signals to the UE in accordance with a periodicity.

Some examples of the method, apparatus, and non-transitory computer-readable medium described above may further include processes, features, means, or instructions for receiving, from the UE, a measurement report comprising information obtained from measurements of the multiple reference signals, wherein the measurement report may be received using a set of beam-specific resources that may be different from the first set of beam-specific AUL resources. Some examples of the method, apparatus, and non-transitory computer-readable medium described above may further include processes, features, means, or instructions for reconfiguring and the multiple sets of beam-specific AUL resources and the respective AUL receive beams for the UE based at least in part on the received measurement report. In some examples of the method, apparatus, and non-transitory computer-readable medium described above, the set of beam-specific resources may be scheduled by a resource grant transmitted to the UE.

In some examples of the method, apparatus, and non-transitory computer-readable medium described above, receiving the AUL transmission of the uplink data comprises receiving the AUL transmission of the uplink data from the UE using the first set of beam-specific AUL resources and a second set of beam-specific AUL resources. In some examples of the method, apparatus, and non-transitory computer-readable medium described above, the multiple sets of beam-specific AUL resources may be configured for a majority of receive beams of the base station.

In some examples of the method, apparatus, and non-transitory computer-readable medium described above, the multiple sets of beam-specific AUL resources may be configured for a subset of receive beams selected from a majority of receive beams of the base station. In some examples of the method, apparatus, and non-transitory computer-readable medium described above, a number of resources in each set of beam-specific AUL resources may be proportional to a traffic load on a corresponding AUL receive beam of the base station. In some examples of the method, apparatus, and non-transitory computer-readable medium described above, each of the multiple reference signals comprise a CSI-RS, or an SSB, or a combination thereof.

DETAILED DESCRIPTION

Figure 1:
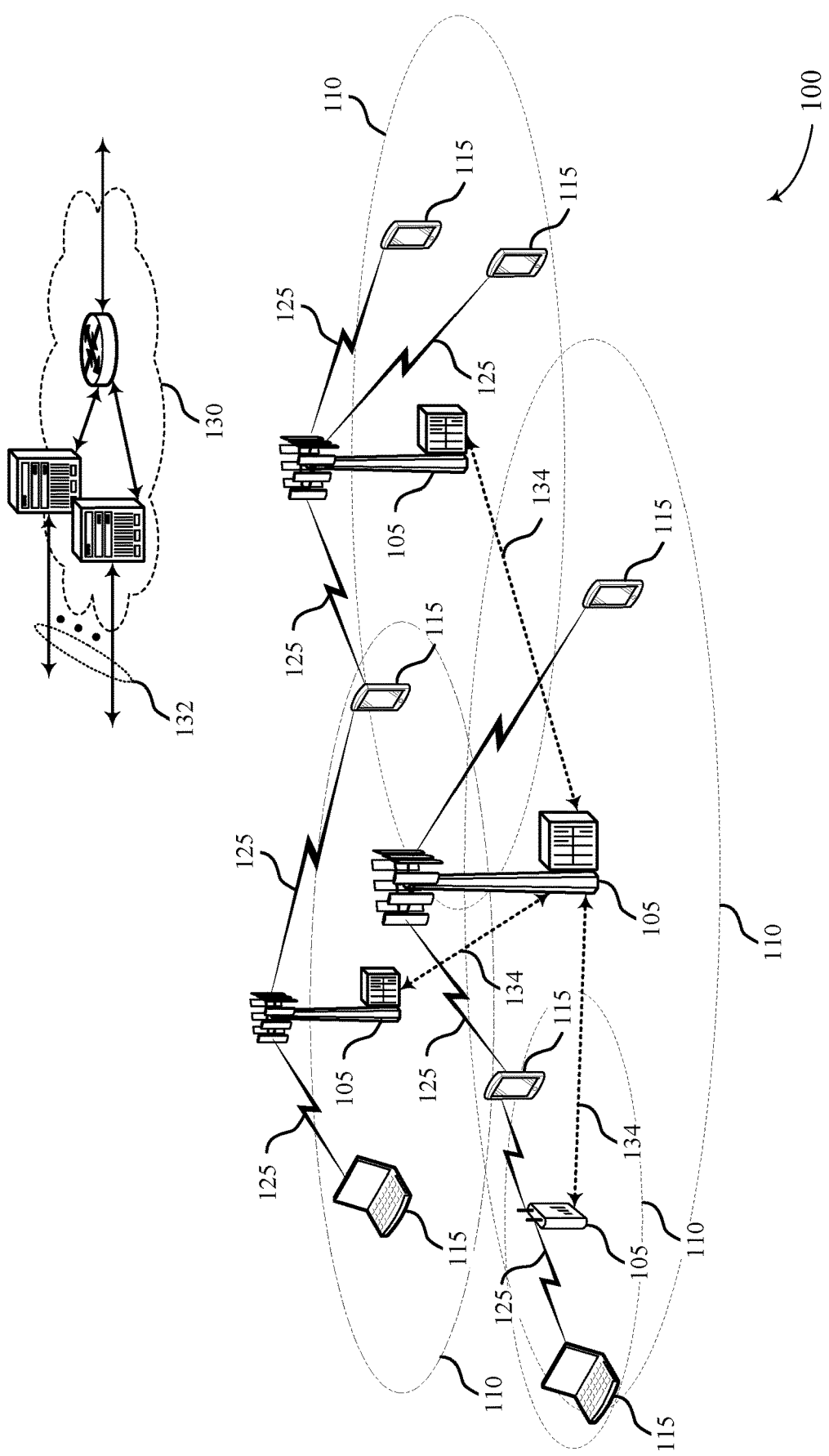
FIG. 1 illustrates an example of a system for wireless communication that supports beam management for autonomous uplink (AUL) with analog beams in accordance with aspects of the present disclosure.

Some wireless communication systems may operate in millimeter wave (mmW) frequency ranges, e.g., from 25 gigahertz (GHz) to 300 GHz. Wireless communication at these frequencies may be associated with increased signal attenuation (e.g., path loss), which may be influenced by various factors, such as temperature, barometric pressure, diffraction, etc. As a result, transmissions may be beamformed to overcome the path loss experienced at these frequencies. Wireless devices within such systems may accordingly communicate via these directional beams (e.g., beamformed for transmission and reception using an antenna array at the wireless device). For example, a base station and a UE may communicate via beam pair links, each beam pair link including a transmit beam of one wireless node (e.g. a UE) and a receive beam of a second wireless node (e.g., a base station).

In such wireless communication systems, a base station may schedule uplink transmissions for a UE on a set of resources, and the base station may then listen in a direction of the UE's scheduled transmission, for example, by forming a receive beam in that direction. By contrast, in certain legacy wireless communication systems, the base station may use omni-directional antennas when receiving transmissions from the UE. Thus, irrespective of a direction that a UE transmits, the base station in certain legacy wireless communication systems can typically detect the transmitted signal without forming a receive beam.

In the case of autonomous uplink (AUL) transmission (e.g., grantless or unscheduled transmission), a base station may not be aware of a direction (and corresponding receive beam) in which to listen for a UE's directional transmission, resulting in missed uplink data and inefficiencies in managing AUL transmissions from the UE. Additionally, the UE's mobility or interference within the system may create further challenges that impact efficient beam management for AUL transmissions. In accordance with some aspects of the subject technology, improved techniques are described for providing efficient beam management for AUL transmissions between a UE and a base station operating at mmW frequency ranges. For example, a base station and a UE may communicate using uplink transmissions from the UE to the base station and downlink transmissions from the base station to the UE. An uplink transmission may be scheduled by sending the UE an uplink grant, which signals to the UE that it may transmit uplink data on configured or scheduled resources. However, a UE may also have a capability to perform an AUL transmission of an uplink message. AUL may refer to the process by which a UE transmits uplink signals to a base station without having to first receive an uplink grant, and AUL functionality may be configured using radio resource control (RRC) messaging or L1 signaling.

In some cases, the mobility of UEs within a communications system that communicates via directional beams may affect AUL transmissions. For example, when a UE changes location, an optimum base station receive beam may change, and the original base station receive beam (i.e., the base station receive beam utilized by a base station before a UE changes location) may no longer be used to detect the AUL transmission from the UE's changed location. Additionally, AUL transmission from a UE may be sporadic, and it may be difficult for the base station (or the UE) to discover the beam pair link is broken or no longer functional. Thus, it may be desirable to ensure that, through beam management for AUL resources, a base station detects AUL transmission along the base station receive beam well suited for AUL transmissions (e.g., a best or optimal base station receive beam determined based at least in part on reference signal strength), and that a UE transmits on the AUL resources corresponding to the base station receive beam that the base station is tuned to, such as in cases of UE mobility within the system.

As described herein, a base station may configure one or more sets of time/frequency AUL resources with an associated (e.g., quasi co-located (QCL)) reference signal, where the AUL resources are specific to a base station receive beam. The presence of the reference signal (or signal strength of the reference signal) may enable a UE to determine availability of AUL resources for an AUL transmission of uplink data. That is, the UE may compare the signal strength of various reference signals and select the reference signal having a highest signal strength, and may use a set of AUL resources that are associated with that strongest reference signal (e.g., a reference signal having a highest reference signal received power (RSRP) or signal to noise ratio (SNR) relative to other reference signals). Further, in the case that a beam pair link between a base station and a UE fails (e.g., due to the UE's mobility, due to interference, etc.), the UE may monitor for the reference signals associated with AUL resources from the base station. Upon detecting a reference signal and determining that it is associated with a set of AUL resources, the UE may transmit on the set of AUL resources that are associated with the detected reference signal using a UE transmit beam that shares the same direction as a corresponding base station receive beam.

Aspects of the disclosure are initially described in the context of a wireless communications system. Further examples are provided that illustrate configured AUL resources used for AUL transmissions. Aspects of the disclosure are further illustrated by and described with reference to apparatus diagrams, system diagrams, and flowcharts that relate to beam management for AUL with analog beams.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communication system may support AUL resource configurations used for efficient beam management for AUL transmissions.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

For example, downlink transmissions on communication links 125 may include transmission of reference signals, such as a CSI-RS, an SSB, and the like. In some instances, the reference signals may be associated with different AUL resources, which may in turn be associated with different receive beams of the base station 105. Accordingly, uplink transmission on communication links 125 may include AUL transmissions sent by a UE 115. The UE 115 may select a particular set of AUL resources for the AUL transmissions based on signal quality of the different reference signals. In some instances, for example, the UE 115 may select a set of AUL resources associated with reference signals having the highest signal strength. The selection of the AUL resources for uplink transmissions may allow the base station 105 to use the appropriate receive beam for receiving the AUL transmissions, The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 25 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. In some cases, UEs 115 and base stations 105 may use directional beams via beamforming to overcome some aspects of attenuation in mmW frequencies. Techniques disclosed herein may be employed across transmissions that use one or more different frequency regions, and designated use of bands across these frequency regions may differ by country or regulating body.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive an secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in the physical broadcast channel (PBCH). The MIB may contain system bandwidth information, an SFN, and a physical hybrid automatic repeat request (HARD) indicator channel (PHICH) configuration. After decoding the MIB, the UE 115 may receive one or more Ms. For example, SIB1 may contain cell access parameters and scheduling information for other SIBs. Decoding SIB1 may enable the UE 115 to receive SIB2. SIB2 may contain RRC configuration information related to random access channel (RACH) procedures, paging, PUCCH, physical uplink shared channel (PUSCH), power control, sounding reference signal (SRS), and cell barring. In some cases, a base station 105 may transmit synchronization signals (SSs) (e.g., PSS SSS, and the like) using multiple beams in a beam-sweeping manner through a cell coverage area. For example, PSS, SSS, and/or broadcast information (e.g., a PBCH) may be transmitted within different SS blocks on respective directional beams, where one or more SS blocks may be included within an SS burst (SSB). In some cases, these SSs and reference signals may be transmitted at different times and/or using different beams. For example, when a UE 115 receives multiple reference signals associated with multiple sets of AUL resources from a base station 105, at least some of the multiple reference signals may comprise an SSB.

After the UE 115 decodes SIB2, it may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an uplink resource grant, a timing advance and a temporary C-RNTI. The UE 115 may then transmit an RRC connection request along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble. In some examples, a base station 105 may transmit multiple reference signals associated with multiple sets of AUL resources to a UE 115, and the base station 105 may receive a RACH message from the UE 115 based at least in part on subsequent transmissions of each of the multiple reference signals becoming undetectable by the UE. The base station 105 may configure, in response to the RACH message, communications resources and a set of receive beams for communicating with the UE 115.

A base station 105 may insert periodic pilot symbols such as a cell-specific reference signal (CRS) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block (RB) based on the number of antenna ports or layers (up to 4) of the receiving UEs 115. In addition to CRS, which may be utilized by all UEs 115 in the coverage area 110 of the base station 105, demodulation reference signal (DMRS) may be directed toward specific UEs 115 and may be transmitted only on RBs assigned to those UEs 115. DMRS may include signals on 6 resource elements in each RB in which they are transmitted. The DMRS for different antenna ports may each utilize the same 6 resource elements, and may be distinguished using different orthogonal cover codes (e.g., masking each signal with a different combination of 1 or −1 in different resource elements). In some cases, two sets of DMRS may be transmitted in adjoining resource elements. In some cases, additional reference signals known as channel state information reference signals (CSI-RS) may be included to aid in generating channel state information (CSI). On the uplink, a UE 115 may transmit a combination of periodic SRS and uplink DMRS for link adaptation and demodulation, respectively. For example, when a UE 115 receives multiple reference signals associated with multiple sets of AUL resources from a base station 105, at least some of the multiple reference signals may comprise CSI-RS.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both. In some cases, a UE 115 may perform an LBT procedure prior to performing an AUL transmission.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. In some cases, the one or more antenna arrays may include directional antenna arrays.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

Downlink control information (DCI), including HARQ information, is transmitted in a physical downlink control channel (PDCCH) carries DCI in at least one control channel elements CCE, which may consist of nine logically contiguous resource element groups (REGs), where each REG contains four resource elements. DCI includes information regarding downlink scheduling assignments, uplink resource grants, transmission scheme, uplink power control, HARQ information, modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI includes additional signaling information. DCI size and format depend on the amount of information as well as factors such as bandwidth, the number of antenna ports, and duplexing mode.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support the configuration of beam-specific AUL resources with an associated reference signal for coherent beam management. For example, a base station 105 may configure respective sets of AUL resources that are specific to one or more base station receive beams. These sets of beam-specific AUL resources may be configured to be associated (e.g., QCL) with a reference signal, such as a CSI-RS, an SSB, or the like. The base station 105 may periodically transmit the reference signals that are associated with the AUL resources. A UE 115, upon detecting one or more of the reference signals, may identify which set of AUL resources are available for an AUL transmission of uplink data. In such cases, the UE 115 may select a set of AUL resources based on a signal strength of the reference signal associated with that set of AUL resources. Additionally, the UE 115 may determine that a reference signal previously having the highest signal strength has gone missing (e.g., the signal strength of the reference signal has fallen below a threshold), and may select another reference signal that is associated with a different set of beam-specific AUL resources. The UE 115 may thus perform subsequent AUL transmissions using the different set of beam-specific AUL resources. The presence of the reference signals associated with respective sets of AUL resources may enable UEs to coherently and continuously monitor for available AUL resources configured by the base station 105. Such beam management techniques may ensure the UE 115 is able to perform AUL transmissions when different beams are utilized for AUL, such as when the UE 115 is mobile and at various positions relative to the base station 105 over time. Likewise, the base station 105 may configure (and reconfigure) AUL resources to account for UE mobility.

Figure 2A:
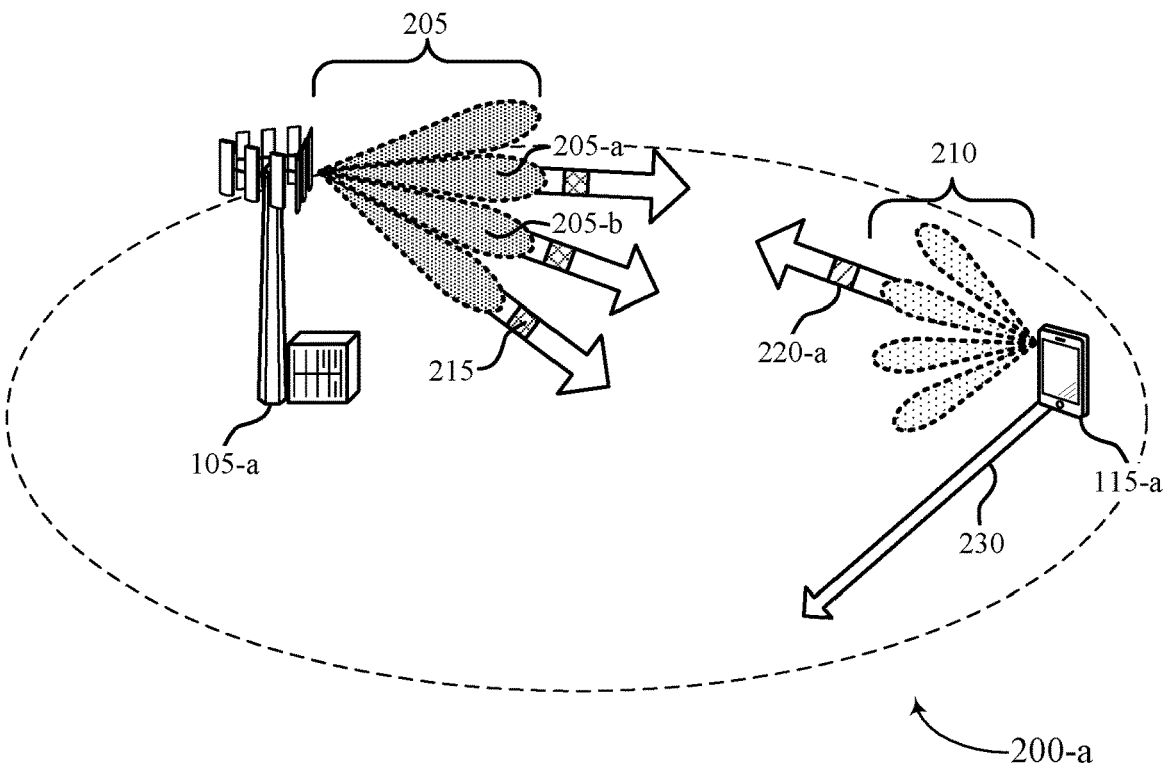
FIGS. 2A and 2B illustrate an example of a wireless communications system that supports beam management for AUL with analog beams in accordance with aspects of the present disclosure.
Figure 2B:
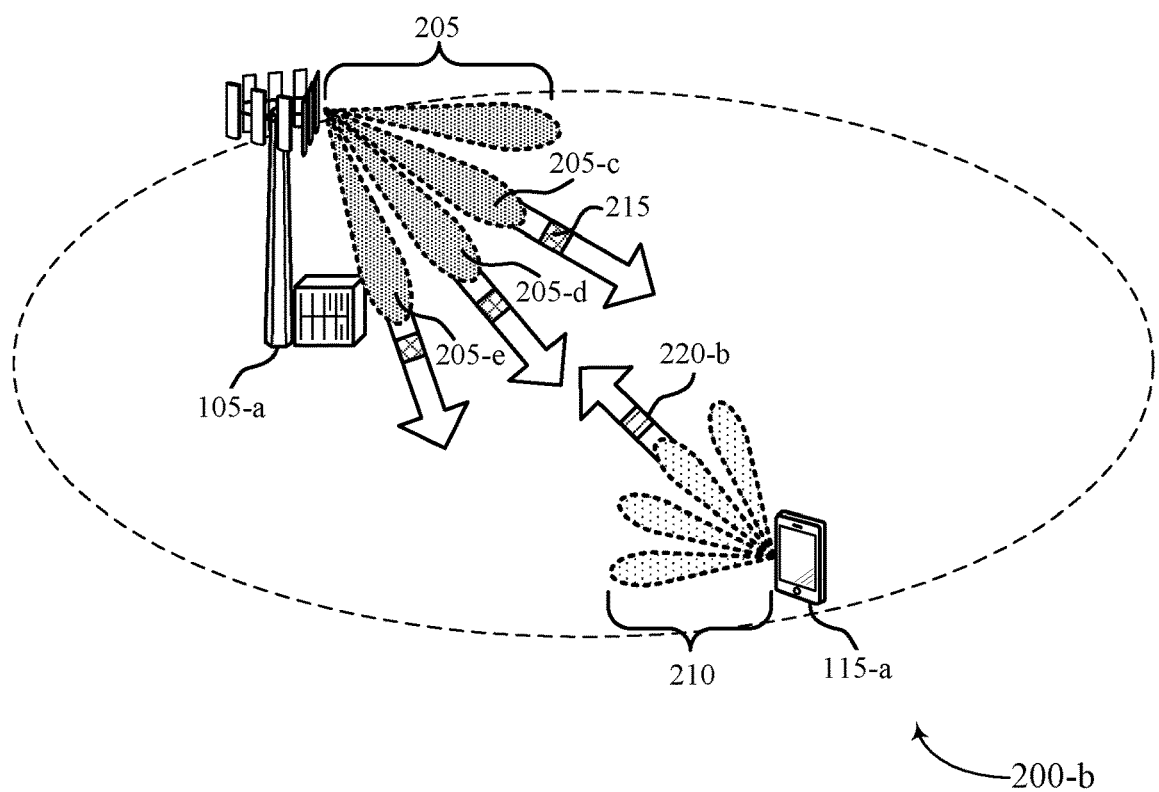

FIGS. 2A and 2B illustrate an example of a wireless communications system 200-a and 200-b that supports beam management for AUL with analog beams in accordance with various aspects of the present disclosure. In some examples, wireless communications systems 200-a and 200-b may implement aspects of wireless communications system 100. For example, wireless communications system 200-a and 200-b includes a base station 105-a and UE 115-a that may be examples of the corresponding devices described with reference to FIG. 1. In some cases, wireless communications system 200-a and 200-b may support uplink communications using resources scheduled by base station 105-a (e.g., scheduled via a resource grant) and may support AUL communications as an alternative to or in addition to scheduled resource grants for UE 115-a. Accordingly, the techniques described herein may be performed by wireless devices that have AUL capabilities and may also receive grants of scheduled resources, for example, from a base station 105. In some cases, wireless communications system 200-a and 200-b may represent a system that supports that association of reference signals with configured AUL resources to enable beam management.

Wireless communications system 200-a and 200-b may operate in frequency ranges that are associated with beamformed transmissions between base station 105-a and UE 115-a. For example, wireless communications system 200 may operate using mmW frequency ranges. As a result, signal processing techniques, such as beamforming, may be used to coherently combine energy and overcome path losses. For example, base station 105-a and UE 115-a may communicate via beam pair links, each beam pair link including, for example, a base station receive beam 205 of base station 105-a and a UE transmit beam 210 of a UE 115-a. It is understood that the respective devices are capable of forming directional beams for transmission and reception, where base station 105-a may also form one or more transmit beams for transmitting on the downlink, and UE 115-a may form corresponding receive beams to receive signals from base station 105-a. Base station 105-a and UE 115-a may utilize directional antenna arrays in forming these transmit and receive beams. These beams may be narrow in comparison to beams formed by omni-directional antenna arrays transmitting and receiving in some frequencies, especially in frequencies outside of mmW frequency ranges, such as sub-6-GHz frequencies. In some cases, base station 105-a may only have the capacity to utilize a single base station receive beam 205 at a time (e.g., during a TTI), and base station 105-a may receive directional transmissions from UE 115-a when monitoring the path of a UE transmit beam 210 (e.g., in a particular direction).

UE 115-a may be capable of AUL transmissions to base station 105-a, and may thus perform AUL transmissions to base station 105-a via a transmit beam 205, which may be received using a corresponding receive beam 210 at base station 105-a. Corresponding beams may be defined as a receive beam 210 that is used to receive signals from a certain direction, where there may be a corresponding transmit beam 205 used to transmit in that direction. Additionally or alternatively, corresponding beams may refer to a transmit beam 205 and receive beam 210 using the same beamforming weights. There may also be correspondence between transmit beams and receive beams at the same device. For instance, base station 105-a may receive a transmission (i.e., in a first direction) on a particular receive beam 210, and base station 105-a may use the same beam path as the receive beam 210 to send downlink transmissions (i.e., in the first direction) on a corresponding transmit beam. The beamforming weights in such a scenario may be the same for both a receive beam 210 and a transmit beam at base station 105-a. The same correspondence may take place for transmit beams 205 and receive beams formed at UE 115-a and UE 115-b. In any case, an AUL transmission (e.g., using AUL resources 220) may be sent on a set of AUL resources by UE 115-a. Base station 105-a may accordingly transmit downlink communications to UE 115-a via downlink beams, which may include an AUL configuration, where the AUL configuration indicates the set of AUL resources for use by a UE 115.

In some cases, an AUL resource 220 may comprise a sensing part and a data part. Different AUL resources 220 may be allocated such that the sensing parts of each AUL resource 220 are transmitted on a different beam pair link while data part may be common for all beam pair links. Thus, the following techniques described in the present disclosure may apply to the sensing part of an AUL resource 220, the data part of an AUL resource 220, or a combination of the two.

Base station 105-a may configure a reference signal 215 (e.g., CSI-RS, SSB, etc.) which may be associated with a configured AUL resource 220. For example, an AUL assignment may be QCL with the configured reference signal 215. A QCL association between a set of AUL resources 220 and a reference signal 215 may correspond to the same or similar base station transmit beam(s) for transmitting the reference signal 215 and corresponding base station receive beams 205 for receiving AUL transmissions. Accordingly, a QCL association may also refer to a QCL relationship between antenna ports, for example, used for the transmission of reference signals 215 and antenna ports that form a base station receive beam 205 for receiving AUL transmissions. Two antenna ports (or two sets of antenna ports) may be said to be QCL, spatially QCL, or have a QCL relationship if properties of the channel over which a symbol on one antenna port is conveyed can be inferred from the channel over which a symbol on the other antenna port is conveyed. For example, if a measured value for a parameter (e.g., delay spread, Doppler spread, Doppler shift, average delay, spatial parameters, etc.) of the channel for a first antenna port (or set of antenna ports) is within a threshold value of a measured value for the parameter of the channel for a second antenna port (or set of antenna ports), then the two antenna ports (or two sets of antenna ports) may be considered to be QCL. That is, if a first signal is transmitted with a first antenna port that is QCL with a second antenna port used to transmit a second signal, then the first signal and the second signal may be communicated via the same transmit beam and receive beam (e.g., the same beam pair link).

Additionally, there may be reciprocity for transmit beams and receive beams. For example, due to reciprocity, base station 105-a transmit beam used to transmit signals may correspond to a base station receive beam 205 for receiving signals in the same direction. Accordingly, base station 105-a may be aware of which UEs 115 are located in various directions, and which base station receive beams 205 may be used at base station 105-a to receive signals from these UEs 115.

UE 115-a may use the reference signals 215 to identify an optimal beam for communications (e.g., a strongest receive beam), and UE 115-a may also associate its own transmissions to base station 105-a in the same direction (e.g., based on the QCL relationship between a received reference signal 215 and a set of AUL resources 220). For instance, UE 115-a may monitor for reference signals 215 associated with respective sets of AUL resources 220 and may transmit an AUL transmission if the reference signal 215 is detected or if the detected reference signal 215 strength is above a threshold. For instance, UE 115-a may use a first set of AUL resources 220-a if a signal strength of an associated reference signal is measured to be greater than a signal strength threshold. In some cases, an AUL resource 220 may not be utilized if the UE 115-a does not detect the reference signal 215 associated with the AUL resource 220 or if a detected reference signal 215 strength falls below a threshold.

Base station 105-a may configure UE 115-a with the one or more sets of AUL resources 220. Each set of AUL resources 220, or multiple sets of AUL resources 220, may be configured with one reference signal 215 (e.g., CSI-RS or SSB) for one base station receive beam 205. This set of AUL resources 220 may be a subset of all reserved AUL resources 220 for the base station receive beams 205, which may allow multiple UEs 115 to multiplex AUL transmissions on the base station receive beams 205. Base station 105-a may periodically transmit the reference signal 215 to one or more UEs 115 using a base station transmit beam that uses the same path as the configured base station receive beam 205.

In some examples, base station 105-a may have multiple receive beams 205 (e.g., up to 64 different beams) available, wherein one or more base station receive beam 205 may be used to receive AUL transmissions from UE 115-a. For one or more base station receive beams 205, base station 105-a may reserve a set of AUL resources 220 for each base station receive beams 205. In some examples, base station 105-a may configure AUL resources 220 for every base station receive beam 205, where there may be an AUL resource 220 available to UE 115-a regardless of the base station receive beam 205 that UE 115-a is tuned to. Such a configuration may result in overhead at the base station 105-a, but at the same time, may also ensure that there are sufficient AUL resources available for UEs 115 to utilize for AUL transmissions.

In other examples, a base station receive beam 205 may not have a corresponding UE transmit beam 210 and base station 105-a may not reserve AUL resources 220 for every base station receive beam 205. For example, there may be no UE 115 located in the region of the cell served by base station 105-a that corresponds to base station receive beam 205-b. Therefore, base station 105-a may not expect to receive AUL transmissions on base station receive beam 205-b and thus base station 105-a may not configure AUL resources 220 for base station receive beam 205-b.

UE 115-a may be configured with AUL resources 220 for a subset of possible receive beams 205. This configuration may reduce overhead at base station 105-a, but it may also lower the available coverage for UE 115-a. As an example, wireless communications system 200-a and 200-b may be configured with 64 base station receive beams 205 for full coverage. However, UE 115-a may be configured with AUL resources 220 that are associated with only 4 base station receive beams 205, which correspond to the strongest base station receive beams 205 (e.g., the base station receive beams 205 that have the highest signal strength or the lowest interference of the base station receive beams 205) and the receive beams 205 that UE 115-a is likely to need for beam management. It may be desirable for base station 105-a to configure AUL resources 220 for "busy" base station receive beams 205 only (e.g., the base station receive beams 205 that experience the most traffic). In such a case, the amount of resources reserved on a base station receive beam 205 may be proportional to how busy the base station receive beam 205 is (e.g., base station receive beam 205-a, which experiences a high amount of traffic, may have a larger amount of AUL resources 220 reserved on it than base station receive beam 205-b, which receives a low amount of traffic).

In some examples, UE 115-a may move in direction 230 within the cell that is served by base station 105-a. In such a case, the beam pair link between base station receive beam 205 and UE transmit beam 210 used for AUL transmissions may be broken. For example, base station 105-a may use base station receive beam 205-a to receive AUL transmissions from UE 115-a, where UE 115-a utilizes a UE transmit beam 210 that corresponds to base station receive beam 205-a (e.g., follows the same path). If UE 115-a changes location within the cell of base station 105-a, base station receive beam 205-a may no longer detect an AUL transmission from UE 115-a when UE 115-a uses the UE transmit beam 210 that corresponded with base station receive beam 205-a at the original location of UE 115-a. In such cases, the AUL transmission may be wasted, so UE 115-a may refrain from continuing AUL transmissions and reestablish the beam pair link with base station 105-a. In some cases, AUL transmissions from UE 115-a to base station 105-a may be sporadic, and the transmissions may be separated by long transmission gaps (e.g., as compared to scheduled uplink transmissions). In such cases, it may be difficult for base station 105-*a* to discover that the beam pair link is broken. Thus, UE 115-*a* may initiate beam reestablishment mechanisms.

UE 115-*a* may be mobile and, with reference to FIG. 2B, UE 115-*a* may change location and therefore break the beam pair link with base station 105-*a* used for AUL transmission. Further, UE 115-*a* may be unable to detect any of the reference signals 215 for the configured first set of AUL resources 220-*a* but may be able to detect one or more other base station receive beams 205 for which UE 115-*a* is configured with another set of AUL resources 220. For example, UE 115-*a* may no longer be able to detect base station receive beams 205-*a* and 205-*b* after changing location, but may be able to detect base station receive beams 205-*c*, 205-*d*, and 205-*e* that each have a configured set of beam-specific AUL resources 220, as illustrated in FIG. 2B. In such cases, UE 115-*a* may use a beam synchronization process with base station 105-*a* and be assigned a different set of AUL resources 220-*b* on the one or more other base station receive beams 205 (e.g., base station receive beams 205-*c*, 205-*d*, and 205-*e*). Such a process may include UE 115-*a* reporting the base station receive beam(s) 205 that the UE detects (e.g., one or more of base station receive beams 205-*c*, 205-*d*, and 205-*e*) and requesting AUL resources 220 for the detected base station receive beam(s) 205. In some cases, if UE 115-*a* is no longer able to detect any reference signals 215 from base station 105-*a* for which an AUL resource is already configured, UE 115-*a* may use another procedure for beam management (e.g., RACH procedures to establish communication with base station 105-*a* again).

UE 115-*a* may detect a reference signal 215 to identify which set of AUL resources 220 can be used. UE 115-*a* may determine a strongest reference signal 215 (e.g., the reference signal 215 that has the highest signal strength or the reference signal 215 that experiences the least interference, which may be based on an RSRP, SNR, signal to interference-plus-noise ratio (SINR), or the like) and use the AUL resources 220 associated with the strongest reference signal 215 for AUL transmission. If multiple reference signals 215 are detected, UE 115-*a* may compare the signal strength of the detected reference signals 215 and determine which AUL resources 220 to utilize based on the comparison. In some examples, UE 115-*a* may no longer detect a current strongest reference signal 215. However, UE 115-*a* may detect other reference signals 215, which may allow UE 115-*a* to continue beam management. For example, UE 115-*a* may determine a new strongest reference signal 215 among the available reference signals 215, and choose to transmit on the AUL resources 220 associated with the new strongest reference signal 215. This solution may provide robustness to the wireless communications system 200-*a* and 200-*b* when beam changes occur or UE 115-*a* changes location. Alternatively or additionally, AUL resource 220 may be used based on a priority order. For example, base station 105-*a* may configure a first AUL resource as a primary AUL resource and a second AUL resource as a secondary AUL resource. In some cases, UE 115-*a* may use the primary AUL resource provided that an associated reference signal strength satisfies a threshold condition (e.g., signal strength is above the threshold). In some cases, UE 115-*a* may use the secondary AUL resource if the primary AUL resource becomes unusable and the secondary AUL resource still satisfies the threshold condition.

In some examples, the remaining AUL resources 220 (i.e., the AUL resources associated with the reference signals 215 that are not determined to be the strongest reference signal 215 or the secondary AUL resource) may be used to report measurements that may trigger an AUL resource reconfiguration. For example, UE 115-*a* may measure the signal strength of the remaining reference signals 215 (e.g., SSB or CSI-RS) and transmit a measurement report comprising information obtained from the measurements to base station 105-*a*. UE 115-*a* thus reports a measurement event (such as a change in its strongest receive beam) using AUL resources 220 for one of the receive beams 205 configured for UE 115-*a*, and UE 115-*a* may be assigned new sets of receive beams 205 and associated AUL resources 220 by base station 105-*a* in response to such a report. Other examples of measurement events may include changes in the beams 205 that UE 115-*a* is able to detect, changes in signal strength or relative signal strength of beams 205 (or reference signals associated with beams 205) by a threshold, and the like. As an example, the measurement report may be transmitted when the signal strength of the strongest reference signal 215 falls below a threshold. In other examples, the measurement report may be reported when the signal strength of one or more of the remaining reference signals 215 becomes larger than the signal strength of the strongest reference signal 215 by a threshold amount. Base station 105-*a* may reconfigure AUL resources 220 based on the measurements. If UE 115-*a* no longer detects any reference signals 215 for which UE 115-*a* was configured AUL resources 220, UE 115-*a* may perform beam management again using a different procedure (e.g. perform RACH).

In some examples, base station 105-*a* may configure UE 115-*a* such that UE 115-*a* transmits an AUL transmission only on the UE transmit beam 210 that corresponds to one base station receive beam 205 (e.g., the base station receive beam 205 that has the highest signal strength of all base station receive beams 205, or a base station receive beam 205 corresponding to a primary AUL resource). In other examples, UE 115-*a* may transmit AUL transmissions on AUL resources 220 that correspond to more than one base station receive beam 205 in parallel. For example, UE 115-*a* may determine that two (e.g., or more) base station receive beams 205 are the base station receive beams for AUL transmission (e.g., base station receive beams 205-*c* and 205-*d* are determined to have a highest signal strength of all base station receive beams 205) or two base station receive beams are both satisfying the threshold condition for communication. In such a case, UE 115-*a* may transmit using the AUL resources 220 that correspond to either one or both of the two determined base station receive beams 205 (e.g., a best or optimal subset of base station receive beams 205). This may allow UE 115-*a* more opportunities to transmit AUL transmissions, which may reduce transmission delays. Additionally or alternatively, parallel transmission may eliminate or otherwise reduce the need for UE 115-*a* to determine the base station receive beam 205 to transmit on. However, there may be a tradeoff between the robustness gained through parallel transmissions and power expenditure at UE 115-*a*.

Figure 3A:
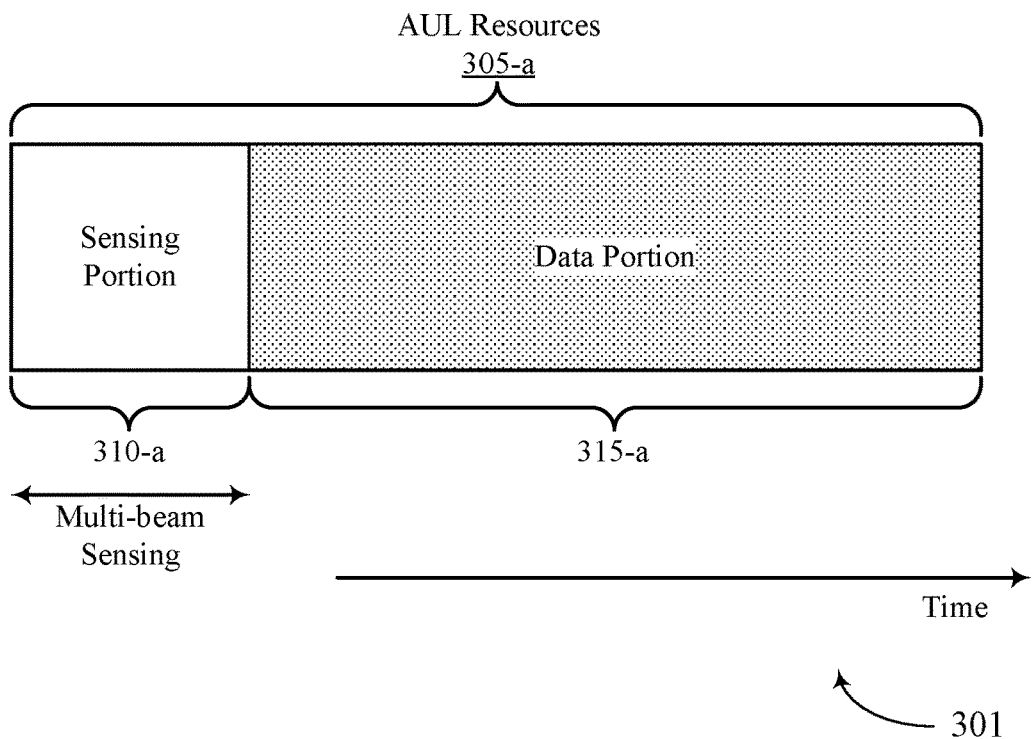
FIGS. 3A and 3B illustrate examples of AUL resource configurations in a system that supports beam management for AUL with analog beams in accordance with aspects of the present disclosure.
Figure 3B:
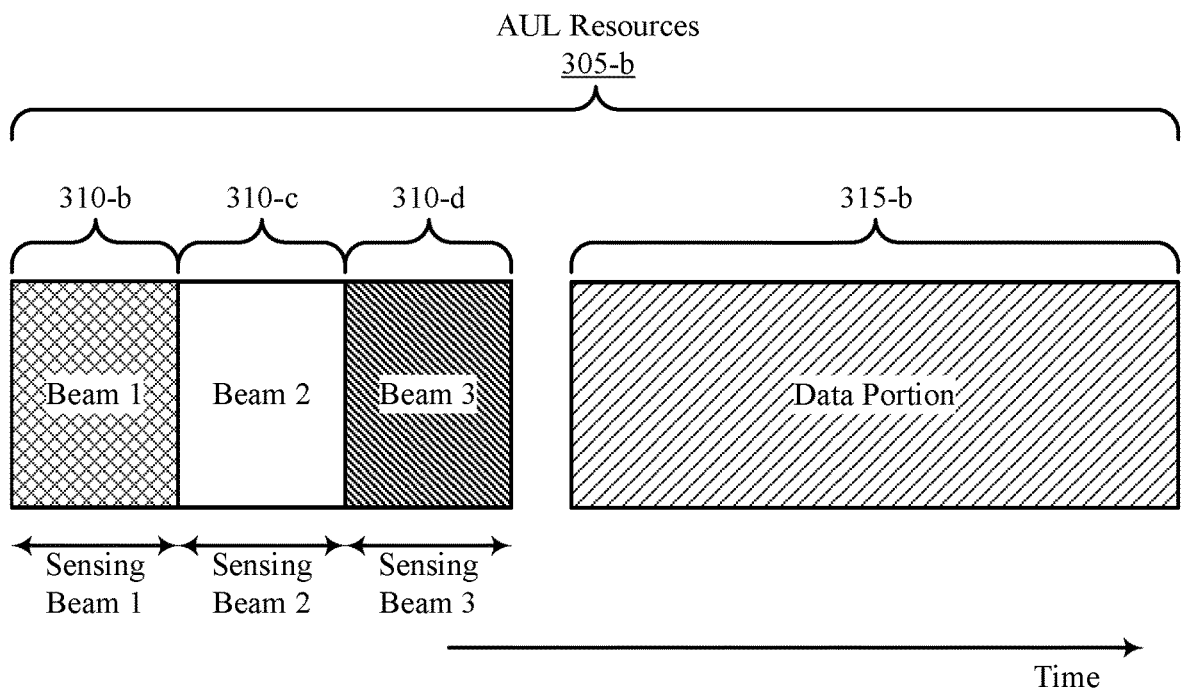

FIGS. 3A and 3B illustrate examples of AUL resource configurations 301 and 302 in a system that supports beam management for AUL with analog beams in accordance with various aspects of the present disclosure. Aspects of AUL resource configurations 301 and 302 may be implemented by a UE 115 and a base station 105, which may be examples of corresponding devices with respect to wireless communications systems 100 and 200. AUL resource configurations 301 and 302 may illustrate an example of AUL resources that are configured for specific receive beams at a base station 105, and that may include a sensing portion and data portion. Additionally, AUL resource configurations 301 and 302 may illustrate AUL resources 305 that are associated with a reference signal and used for beam management for a UE 115.

As described above, an AUL assignment of one or more sets of AUL resources 305 may be configured to be QCL with a reference signal. Resources (e.g., AUL resources 305) may be defined as time/frequency resources that include, for example, one or more of an RB, a beam, a subframe, and the like. For instance, an RB may be a smallest unit of time/frequency resources allocated to a user, which may comprise a number of subcarriers (e.g., 12 subcarriers) with a duration of a slot. Accordingly, a base station 105 may configure respective time-domain AUL resources 305 for a UE 115, where base station 105-a may use a different receive beam for receiving AUL transmissions. In some examples, the base station 105 may configure different AUL resources 305 for different UEs 115 on different beams, where the AUL resources 305 may overlap in time. For instance, base station 105 may configure a first AUL resource set specific to a first base station receive beam with a first associated reference signal, a second AUL resource set specific to a second base station receive beam with a second associated reference signal, and so on. Additionally, a set of AUL resources 305 may include a sensing portion 310, or a data portion 315, or a combination thereof. In some cases, the resources in the sensing portion 310, the data portion 315, or both, may be configured for base station receive beams that are determined to be busier than others (e.g., based on a traffic load). The amount of resources (e.g., the number of RBs) within a set of AUL resources 305 may also be proportional to how busy the corresponding receive beam is.

In some examples, such as illustrated in AUL resource configuration 301 in FIG. 3A, a set of AUL resources 305-a may have overlapping sensing portions 310-a, where a data portion 315-a may be non-overlapping and time division multiplexed. In such cases, a base station 105 may support a multi-beam sensing capability (e.g., omni-directional sensing) that enables the base station 105 to receive multiple transmit beams from different directions during when a sensing portion 310 is transmitted. In such cases, UEs 115 may simultaneously transmit their respective AUL transmissions that include sensing signals to the base station 105.

Based on the presence and/or a received signal strength of the received sensing signals within an AUL transmission, the base station 105 may determine the beam direction of each UE 115 that may be performing an AUL transmission. Accordingly, the base station 105 may tune its receive beam prior to or during data portion 315-a to align with the determined transmit beam paths corresponding to a UE 115, which may allow the base station 105 to receive the respective data portion 315-a from the UE 115. A UE 115 may multiplex its respective data portions 315 along the same transmit beam path as their respective sensing signals, where the base station 105 may be capable of receiving the data portions 315 after tuning or re-tuning its receive beams to align with the respective transmit beams of the UEs 115. In some examples, the UEs 115 may transmit DMRS for both the sensing portion 310-a and the data portion 315-a.

Additionally or alternatively, and as illustrated in AUL resource configuration 302 in FIG. 3B, respective sensing portions 310 for different base station receive beams may be time division multiplexed and non-overlapping for different beams, and the data portion 315 may also be non-overlapping and time division multiplexed. A UE 115 may transmit an AUL indication or a sensing signal to a base station 105 in one or more of the sensing portions 310, where the multiple sensing portions 310 are multiplexed such that they do not overlap in time. For example, sensing portions 310-b, 310-c, and 310-d may each correspond to a different base station receive beam, and may be multiplexed such that they do not overlap in time. As a result, a UE 115, with uplink data to transmit, may identify a reference signal associated (i.e., QCL) with one (or more) of the sensing portions 310 and/or the data portion 315, and may determine whether the sensing portion and/or the data portion 315 is available for an AUL transmission. In some cases, if the UE 115 is aware of a mapping between a sensing portion 310 and a receive beam at the base station 105, the UE 115 may transmit the sensing signal only on the associated beam. Upon sensing an AUL indicator or sensing signal in one or more of the sensing portions 310, the base station 105 may tune its receive beam to receive a data portion 315-b of an AUL transmission.

Figure 4:
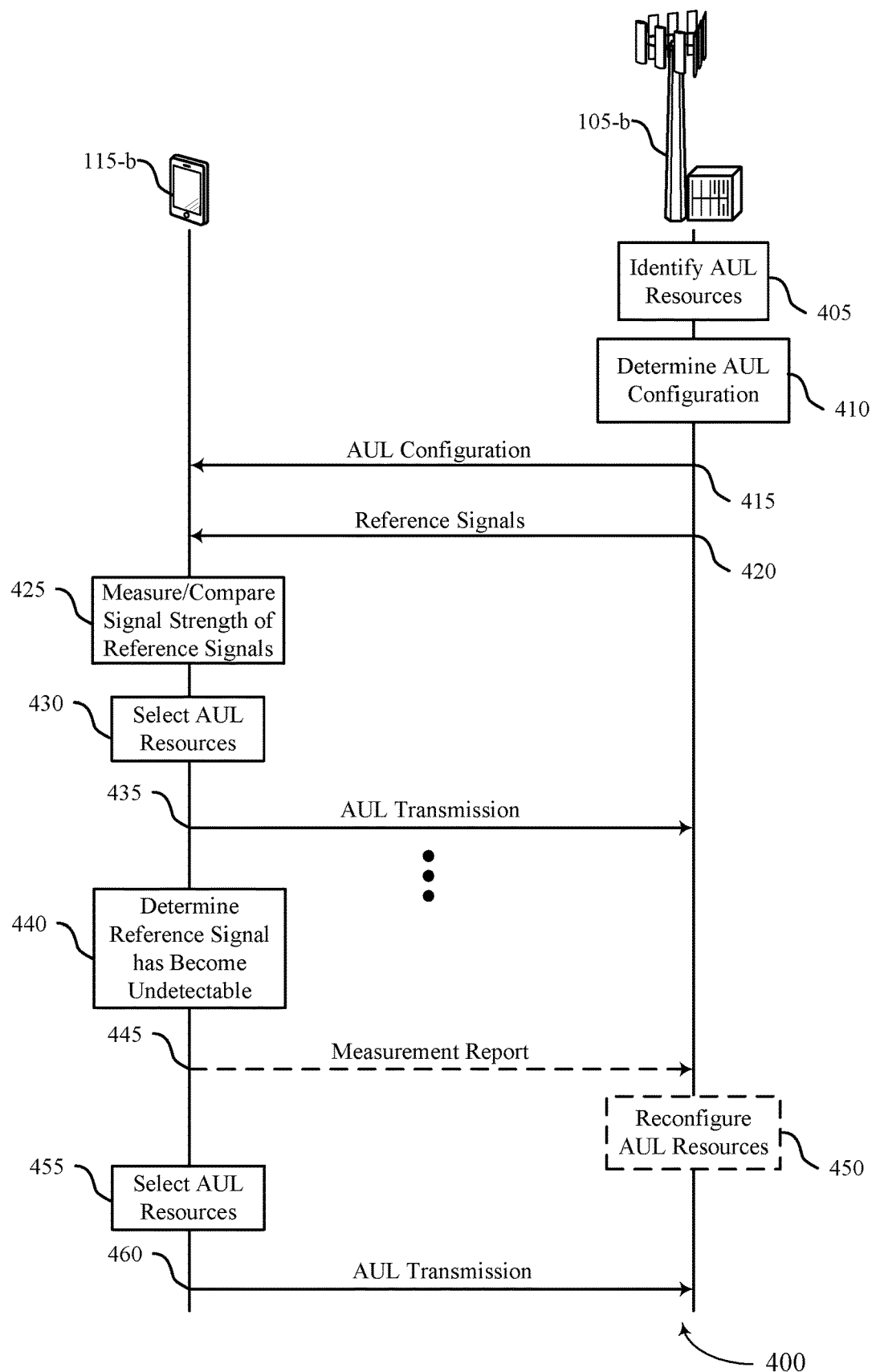
FIG. 4 illustrates an example of a process flow in a system that supports beam management for AUL with analog beams in accordance with aspects of the present disclosure.

FIG. 4 illustrates an example of a process flow 400 in a system that supports beam management for AUL with analog beams in accordance with various aspects of the present disclosure. In some examples, process flow 400 may implement aspects of wireless communications system 100 and 200. For instance, process flow 400 includes UE 115-b and base station 105-b, which may be examples of the corresponding devices described with reference to FIGS. 1, 2A and 2B. Process flow 400 may illustrate beam management techniques for AUL transmissions, where reference signals are associated with one or more sets of beam-specific AUL resources.

At 405, base station 105-b may identify multiple sets of AUL resources for one or more UEs 115 (e.g., including UE 115-b). In some examples, the AUL resources may include a sensing portion, a data portion, or both. In some cases, different AUL resources may be allocated for multiple base station receive beams to the sensing portion, but the data portion may be common to all base station receive beams.

At 410, base station 105-b may determine an AUL configuration for the multiple sets of AUL resources and multiple AUL receive beams of the base station. Each of the multiple sets of AUL resources may be specific to a respective AUL receive beam of base station 105-b, and one or more sets of AUL resources may be associated (e.g., QCL) with a reference signal. In some cases, the reference signals may include a CSI-RS, or a SSB, or a combination thereof. The multiple sets of beam-specific AUL resources may be configured for a majority of receive beams (and, in some cases, every receive beam) of base station 105-b, or may be configured for a subset of receive beams selected from the majority of the receive beams (and, in some cases, every receive beam) of base station 105-b. For instance, base station 105-b may have a total number of receive beams (e.g., 64 beams), but base station 105-b may only configure UE 115-b with a subset (e.g., 4 beams) of the total number of beams. In some cases, a number of resources in each set of beam-specific AUL resources may be proportional to a traffic load on a corresponding AUL receive beam of base station 105-b.

At 415, base station 105-b may transmit, and UE 115-b may receive, the AUL configuration. For instance, base station 105-a may semi-statically (e.g., through RRC messaging or DCI) or dynamically (e.g., through DCI or a downlink trigger) transmit an indication of the configured AUL resources. At 420, base station 105-b may transmit multiple reference signals associated with the multiple sets of beam-specific AUL resources to UE 115-*b*. In some cases, the reference signals may be transmitted (and received) with a certain periodicity.

At 425, UE 115-*b* may measure a signal strength of the multiple reference signals. Additionally, UE 115-*b* may compare the measured signal strengths of the multiple reference signals. For example, UE 115-*b* may compare a signal strength of a first reference signal with a signal strength of a second reference signal of the multiple reference signals. At 430, UE 115-*b* may select a first set of beam-specific AUL resources from the multiple sets of beam-specific AUL resources based at least in part on a signal strength of the first reference signal of the multiple reference signals. For example, selecting the first set of beam-specific AUL resources may be based at least in part on the comparison, where the first reference signal (associated with the first set of beam-specific AUL resources) may have a greater signal strength than the second reference signal. In some cases, UE 115-*b* may determine that the signal strength of the first reference signal satisfies a threshold and may select the first set of beam-specific AUL resources based on the determination that the signal strength of the first reference signal satisfies the threshold. In another example, the AUL resource may also be used based on a priority order. For example, base station 105-*b* may configure a first AUL resource as a primary AUL resource and a second AUL resource as a secondary AUL resource. In some cases, UE115-*b* may use the primary AUL resource provided an associated reference signal signal strength satisfies a threshold condition (e.g. signal strength is above the threshold). In some cases, UE115-*b* may use the secondary AUL resource if the primary becomes unusable and the secondary AUL resource still satisfies the threshold condition.

At 435, UE 115-*b* may perform an AUL transmission of uplink data to base station 105-*b* using the selected first set of beam-specific AUL resources. In some cases, UE 115-*b* may also select a second set of beam-specific AUL resources, and the AUL transmission may be performed using one or both of the first and second sets of beam-specific AUL resources. That is, UE 115-*b* may optionally perform a parallel AUL transmission of the uplink data that is received using multiple base station receive beams.

At a later time, at 440, UE 115-*b* may determine that subsequent transmissions of the first reference signal have become undetectable based on the signal strength of the first reference signal. For instance, UE 115-*b* may be mobile and the previously-used reference signal may become undetectable due to a new location of UE 115-*b* relative to base station 105-*b*. In other examples, the first reference signal may become undetectable (e.g., the signal strength of the first reference signal may drop below or fail to satisfy a threshold) due to interference affecting the transmitted reference signals. In some cases, UE 115-*b* may determine that subsequent transmissions of all of reference signals have become undetectable based at least in part on a signal strength of each reference signal of the multiple reference signals. In such cases, UE 115-*b* may transmit a request message (e.g., a RACH message) to base station 105-*b* to configure communications resources for a set of base station receive beams.

At 445, UE 115-*b* may optionally transmit a measurement report to base station 105-*b*, where the measurement report may include information obtained from measurements of the multiple reference signals (e.g., at 425, or at some other time). In some cases, the measurement report may be transmitted using a set of beam-specific resources that is different from the selected first set of beam-specific AUL resources. For instance, the set of beam-specific resources used for sending the measurement report may include resources that are configured as part of the AUL configuration of the multiple sets of AUL resources. Additionally or alternatively, the set of beam-specific resources used for sending the measurement report may be scheduled through a resource grant received (e.g., an uplink grant received via DCI or other types of signaling) from base station 105-*b*. In some examples, the measurement report is transmitted upon determining that a signal strength of the first reference signal no longer satisfies a threshold. Additionally or alternatively, the measurement report may be transmitted upon determining that a signal strength of a second reference signal becomes larger than the signal strength of the first reference signal by a threshold amount. At 450, base station 105-*b* may optionally reconfigure the multiple sets of beam-specific AUL resources and the respective AUL receive beams for the UE based on the received measurement report.

At 455, UE 115-*b* may optionally select a second set of beam-specific AUL resources from the multiple sets of beam-specific AUL resources based at least in part on a signal strength of a second reference signal of the multiple reference signals. At 460, UE 115-*b* may perform a second AUL transmission of uplink data to base station 105-*b* using the selected second set of beam-specific AUL resources. UE 115-*b* may accordingly repeat the above beam management processes as reference signals become undetectable or based on the reconfiguration of AUL resources by base station 105-*b*.

Figure 5:
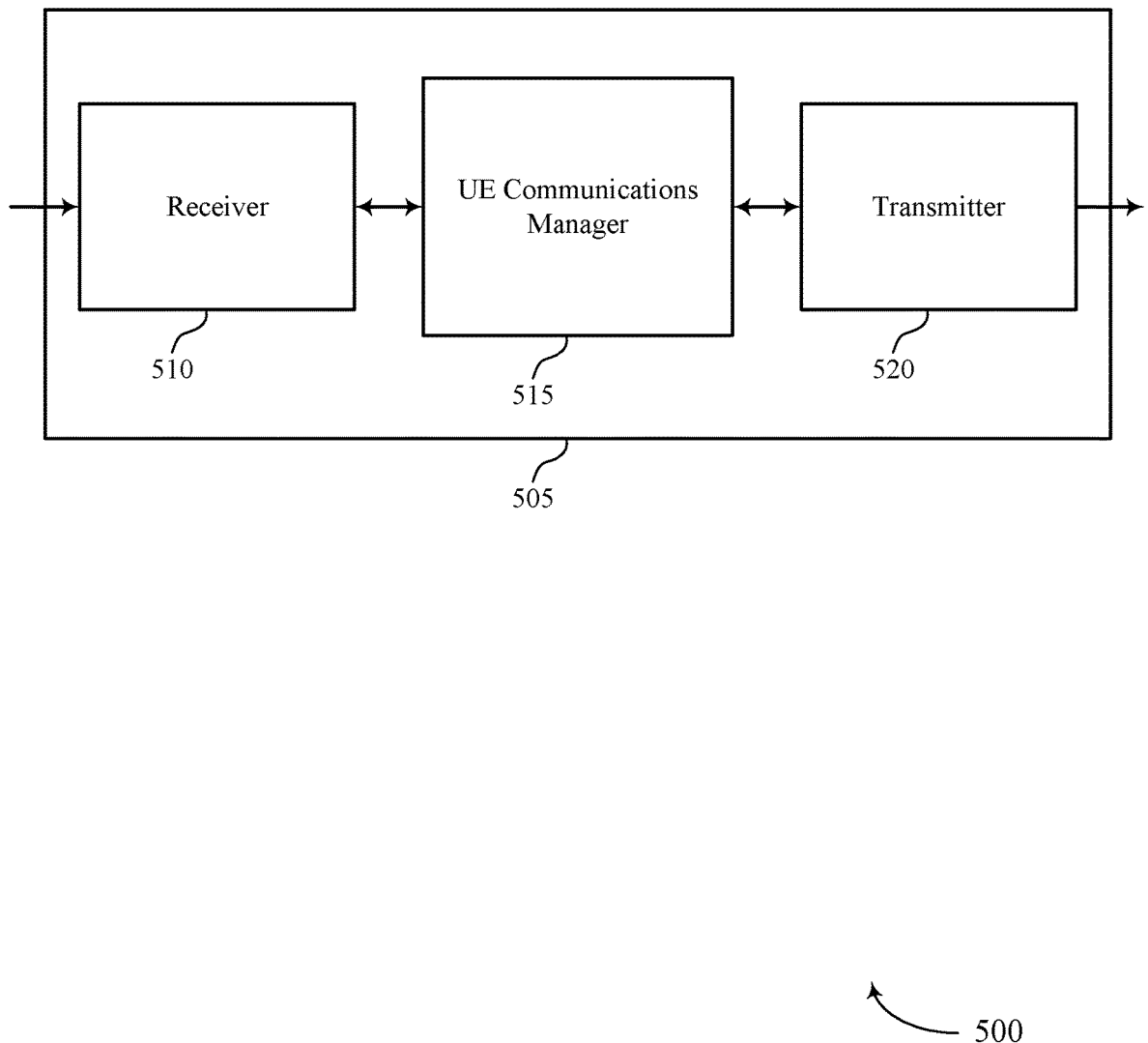
FIGS. 5 through 7 show block diagrams of a device that supports beam management for AUL with analog beams in accordance with aspects of the present disclosure.

FIG. 5 shows a block diagram 500 of a wireless device 505 that supports beam management for AUL with analog beams in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to beam management for AUL with analog beams, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may receive, from a base station 105, an AUL configuration including an indication of multiple sets of AUL resources for the UE 115, where each set of AUL resources of the multiple sets of AUL resources is specific to a respective AUL receive beam of the base station 105 and is associated with a reference signal. UE communications manager 515 may receive multiple reference signals associated with the multiple sets of beam-specific AUL resources from the base station 105, select a first set of beam-specific AUL resources from the multiple sets of beam-specific AUL resources based on a signal strength of a first reference signal of the multiple reference signals, and perform an AUL transmission of uplink data to the base station 105 using the selected first set of beam-specific AUL resources.

Transmitter 520 may transmit signals generated by other components of the device. For example, the transmitter 520 may transmit an AUL transmission to the base station 105 using the first set of beam-specific AUL resources selected by the UE communications manager 515. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
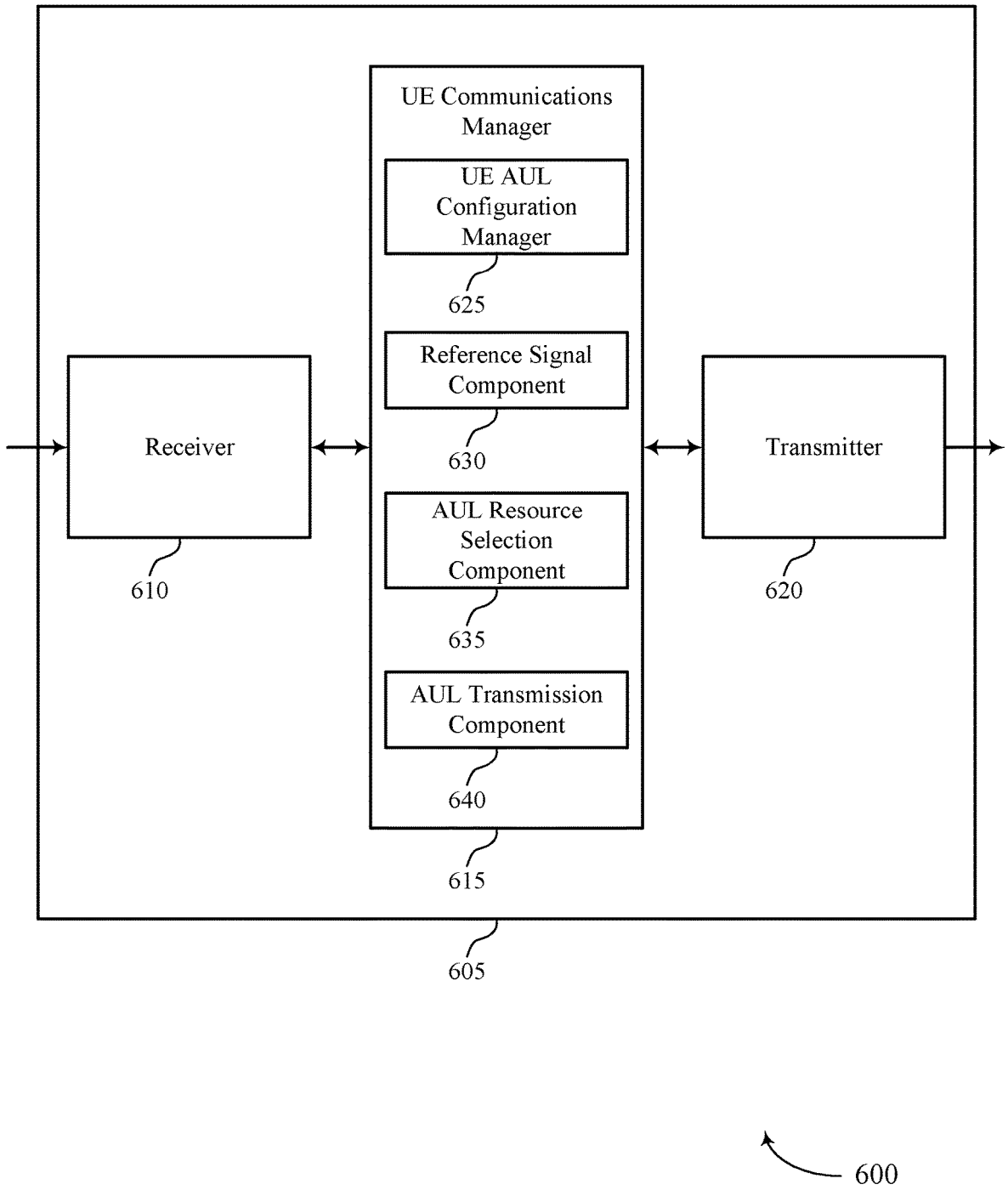

FIG. 6 shows a block diagram 600 of a wireless device 605 that supports beam management for AUL with analog beams in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to beam management for AUL with analog beams, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include UE AUL configuration manager 625, reference signal component 630, AUL resource selection component 635, and AUL transmission component 640. Each feature described with respect to UE communications manager 615, UE AUL configuration manager 625, reference signal component 630, AUL resource selection component 635, and AUL transmission component 640 are optional and separable from other features described with respect to UE communications manager 615, UE AUL configuration manager 625, reference signal component 630, AUL resource selection component 635, and AUL transmission component 640.

UE AUL configuration manager 625 may receive, from a base station 105, an AUL configuration including an indication of multiple sets of AUL resources for the UE 115, where each set of AUL resources of the multiple sets of AUL resources is specific to a respective AUL receive beam of the base station 105 and is associated with a reference signal. In some cases, the multiple sets of beam-specific AUL resources are configured for a majority of receive beams (and, in some cases, every receive beam) of the base station 105. Additionally or alternatively, the multiple sets of beam-specific AUL resources may be configured for a subset of receive beams selected from the majority of the receive beams (and, in some cases, every receive beam) of the base station 105. In some cases, a number of resources in each set of beam-specific AUL resources is proportional to a traffic load on a corresponding AUL receive beam of the base station 105. In some cases, the AUL configuration may be received via RRC signaling from the base station 105.

Reference signal component 630 may receive multiple reference signals associated with the multiple sets of beam-specific AUL resources from the base station 105. In some cases, reference signal component 630 may determine that subsequent transmissions of a first reference signal have become undetectable based on the signal strength of the first reference signal. Additionally or alternatively, reference signal component 630 may determine that subsequent transmissions of the multiple reference signals have become undetectable based on a signal strength of each reference signal of the multiple reference signals. In some cases, reference signal component 630 may compare a signal strength of the first reference signal with a signal strength of a second reference signal of the multiple reference signals. In some cases, receiving the multiple reference signals includes receiving the multiple reference signals in accordance with a periodicity. In some cases, each of the multiple reference signals include a CSI-RS, or an SSB, or a combination thereof. Reference signal component 630 may be coupled with receiver 610 to perform various functions described herein, such as receiving the multiple reference signals.

AUL resource selection component 635 may select a first set of beam-specific AUL resources from the multiple sets of beam-specific AUL resources based on a signal strength of a first reference signal of the multiple reference signals. In some cases, AUL resource selection component 635 may select a second set of beam-specific AUL resources from the multiple sets of beam-specific AUL resources based on a signal strength of a second reference signal of the multiple reference signals. In some examples, AUL resource selection component 635 may select the first set of beam-specific AUL resources based on the determination that the signal strength of the first reference signal satisfies the threshold. In some cases, selecting the first set of beam-specific AUL resources may be based on the comparison of the signal strength of the first reference signal and the signal strength of the second reference signal. Additionally or alternatively, selecting the first set of beam-specific AUL resources includes determining that the signal strength of the first reference signal is greater than the signal strength of the second reference signal. In some cases, selecting the first set of beam-specific AUL resources includes determining that the signal strength of the first reference signal satisfies a threshold.

AUL transmission component 640 may perform an AUL transmission of uplink data to the base station 105 using the selected first set of beam-specific AUL resources. Additionally or alternatively, AUL transmission component 640 may perform a second AUL transmission of uplink data to the base station 105 using the selected second set of beam-specific AUL resources. In some examples, performing the AUL transmission of the uplink data includes performing the AUL transmission of the uplink data using the selected first set of beam-specific AUL resources and a selected second set of beam-specific AUL resources. For instance, the AUL transmission may be performed using the first set of beam-specific AUL resources, or the second set of beam-specific AUL resources, or a combination thereof. In some cases, AUL transmission component 640 may be coupled with and perform the above described functions in coordination with transmitter 620.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
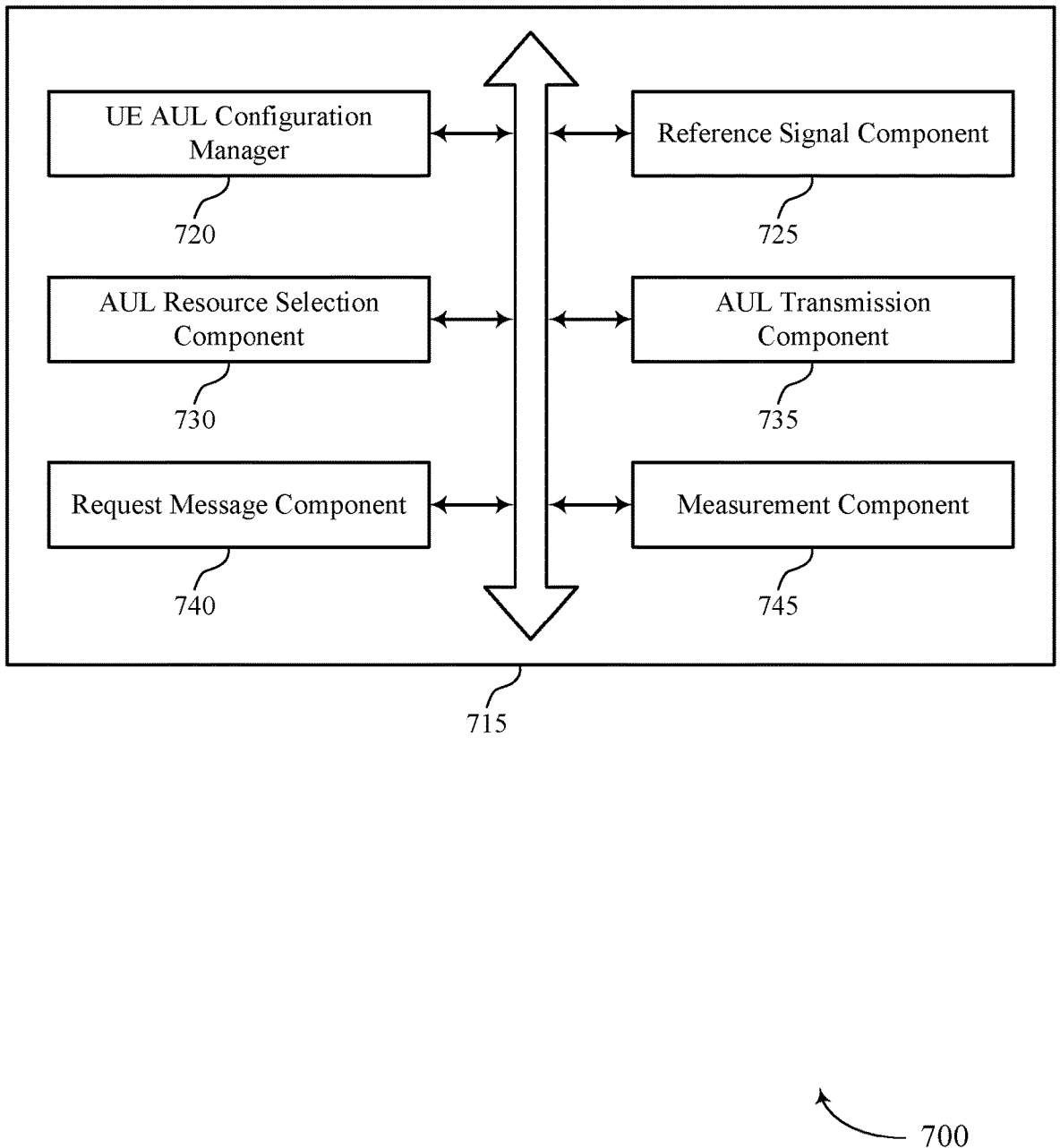

FIG. 7 shows a block diagram 700 of a UE communications manager 715 that supports beam management for AUL with analog beams in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include UE AUL configuration manager 720, reference signal component 725, AUL resource selection component 730, AUL transmission component 735, request message component 740, and measurement component 745. Each of these modules may communicate, directly or indirectly, with one another (e.g., via one or more buses).

UE AUL configuration manager 720 may receive, from a base station 105, an AUL configuration including an indication of multiple sets of AUL resources for the UE 115, where each set of AUL resources of the multiple sets of AUL resources is specific to a respective AUL receive beam of the base station 105 and is associated with a reference signal. In some cases, the multiple sets of beam-specific AUL resources are configured for a majority of receive beams (and, in some cases, every receive beam) beam of the base station 105. Additionally or alternatively, the multiple sets of beam-specific AUL resources may be configured for a subset of receive beams selected from the majority of the receive beams (and, in some cases, every receive beam) of the base station 105. In some cases, a number of resources in each set of beam-specific AUL resources is proportional to a traffic load on a corresponding AUL receive beam of the base station 105.

Reference signal component 725 may receive multiple reference signals associated with the multiple sets of beam-specific AUL resources from the base station 105. In some cases, reference signal component 725 may determine that subsequent transmissions of a first reference signal have become undetectable based on the signal strength of the first reference signal. Additionally or alternatively, reference signal component 725 may determine that subsequent transmissions of the multiple reference signals have become undetectable based on a signal strength of each reference signal of the multiple reference signals. In some cases, reference signal component 725 may compare a signal strength of the first reference signal with a signal strength of a second reference signal of the multiple reference signals. In some cases, receiving the multiple reference signals includes receiving the multiple reference signals in accordance with a periodicity. In some cases, each of the multiple reference signals include a CSI-RS, or an SSB, or a combination thereof.

AUL resource selection component 730 may select a first set of beam-specific AUL resources from the multiple sets of beam-specific AUL resources based on a signal strength of a first reference signal of the multiple reference signals. In some cases, AUL resource selection component 730 may select a second set of beam-specific AUL resources from the multiple sets of beam-specific AUL resources based on a signal strength of a second reference signal of the multiple reference signals. In some examples, AUL resource selection component 730 may select the first set of beam-specific AUL resources based on the determination that the signal strength of the first reference signal satisfies the threshold. In some cases, selecting the first set of beam-specific AUL resources may be based on the comparison of the signal strength of the first reference signal and the signal strength of the second reference signal. In some cases, selecting the first set of beam-specific AUL resources includes determining that the signal strength of the first reference signal satisfies a threshold.

AUL transmission component 735 may perform an AUL transmission of uplink data to the base station 105 using the selected first set of beam-specific AUL resources. Additionally or alternatively, AUL transmission component 735 may perform a second AUL transmission of uplink data to the base station 105 using the selected second set of beam-specific AUL resources. In some examples, performing the AUL transmission of the uplink data includes performing the AUL transmission of the uplink data using the selected first set of beam-specific AUL resources and/or a selected second set of beam-specific AUL resources.

Request message component 740 may transmit a request message to the base station 105 to configure communications resources for a set of base station 105 receive beams (e.g., should all reference signals from the base station become undetectable). In some cases, the request message includes a RACH message. Measurement component 745 may measure a signal strength of the multiple reference signals and transmit, to the base station 105, a measurement report including information obtained from the measurements of the multiple reference signals, where the measurement report is transmitted using a set of beam-specific resources that is different from the selected first set of beam-specific AUL resources. In some cases, the measurement report is transmitted upon determining that a signal strength of the first reference signal no longer satisfies a threshold. In some cases, the measurement report is transmitted upon determining that a signal strength of a second reference signal becomes larger than the signal strength of the first reference signal by a threshold amount. In some examples, the set of beam-specific resources is scheduled by a resource grant received from the base station 105.

Figure 8:
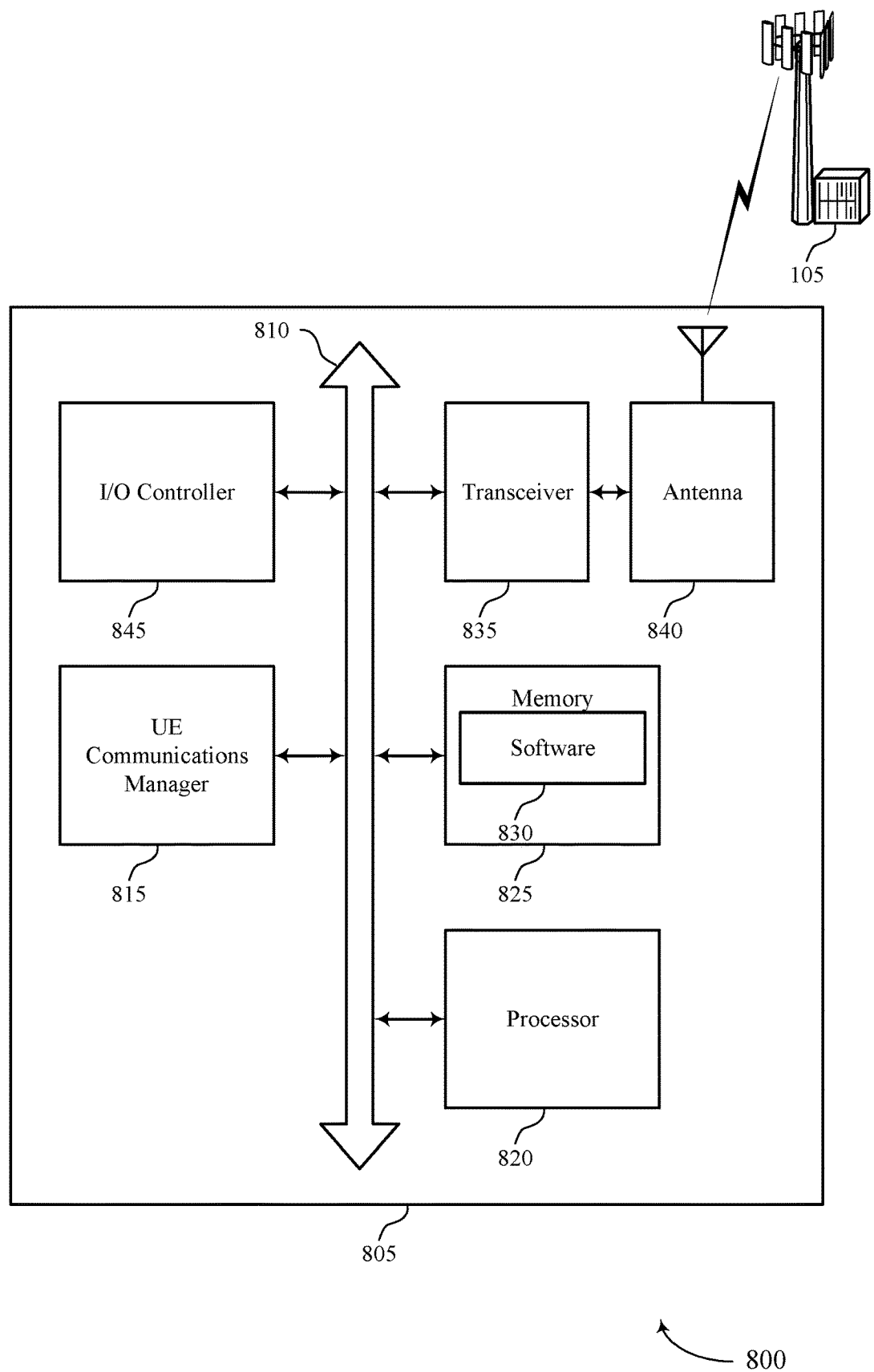
FIG. 8 illustrates a block diagram of a system including a user equipment (UE) that supports beam management for AUL with analog beams in accordance with aspects of the present disclosure.

FIG. 8 shows a diagram of a system 800 including a device 805 that supports beam management for AUL with analog beams in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting beam management for AUL with analog beams).

Memory 825 may include random-access memory (RAM) and read-only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support beam management for AUL with analog beams as described, for example, with reference to FIGS. 13-16. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
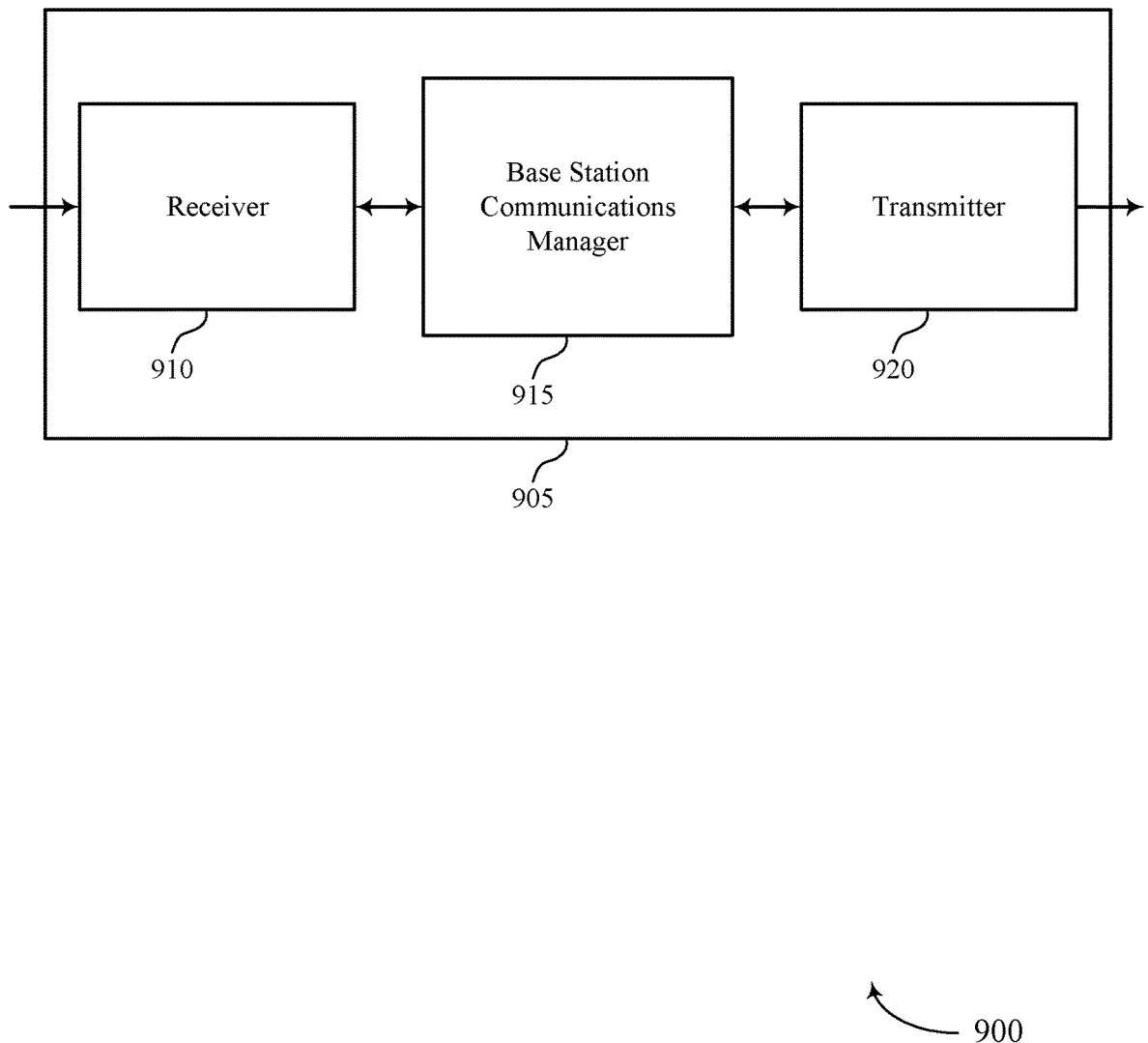
FIGS. 9 through 11 show block diagrams of a device that supports beam management for AUL with analog beams in accordance with aspects of the present disclosure.

FIG. 9 shows a block diagram 900 of a wireless device 905 that supports beam management for AUL with analog beams in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to beam management for AUL with analog beams, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may identify multiple sets of AUL resources for a UE 115 and determine an AUL configuration for the multiple sets of AUL resources and multiple AUL receive beams of the base station 105, where each of the multiple sets of AUL resources is specific to a respective AUL receive beam of the base station 105 and is associated with a reference signal. Base station communications manager 915 may transmit multiple reference signals associated with the multiple sets of beam-specific AUL resources to the UE 115 and receive an AUL transmission of uplink data from the UE 115 based on the multiple reference signals, where the AUL transmission is received using a first set of beam-specific AUL resources from the multiple sets of AUL resources.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
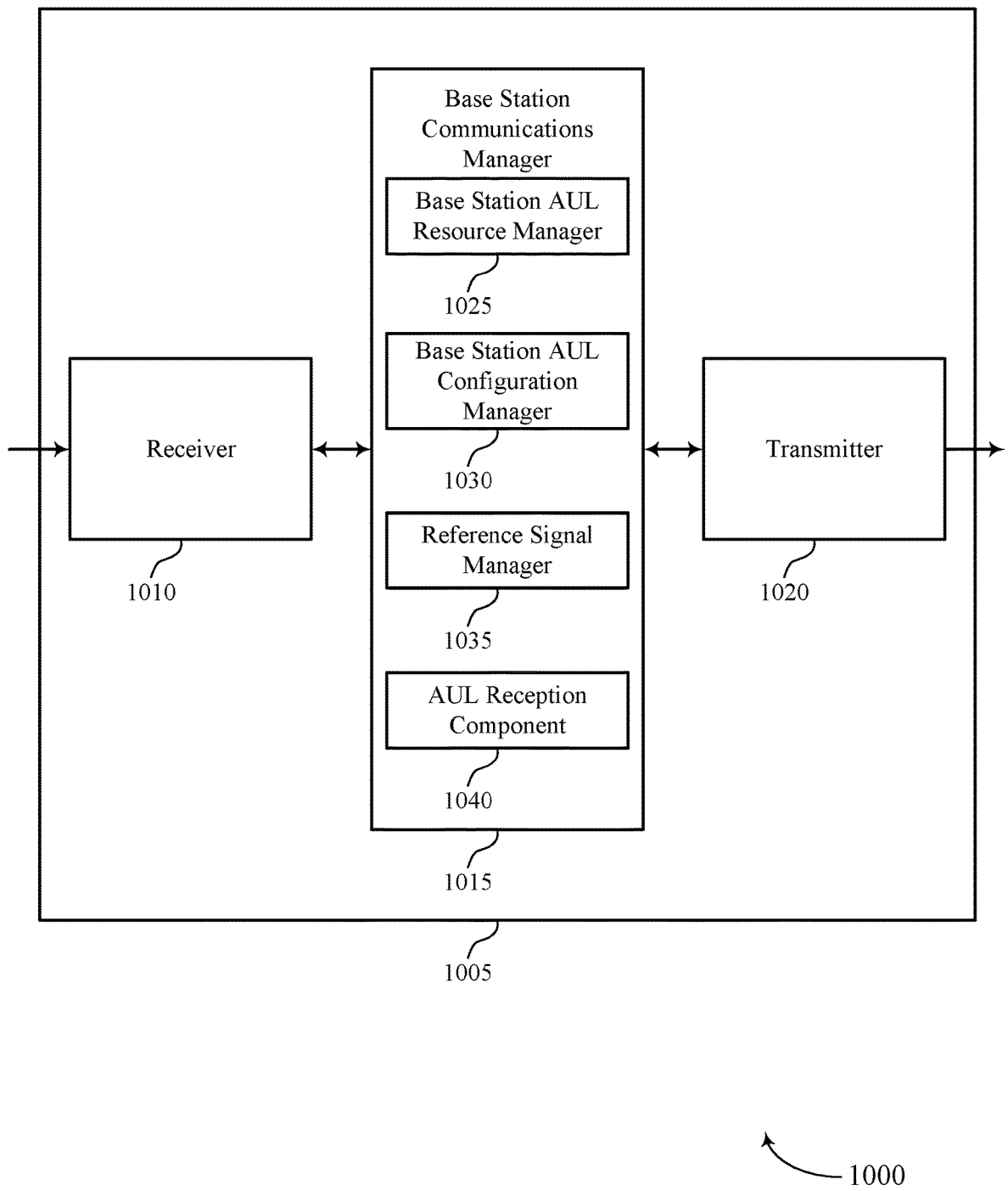

FIG. 10 shows a block diagram 1000 of a wireless device 1005 that supports beam management for AUL with analog beams in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to beam management for AUL with analog beams, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include base station AUL resource manager 1025, base station AUL configuration manager 1030, reference signal manager 1035, and AUL reception component 1040. Each feature described with respect to base station communications manager 1015, base station AUL resource manager 1025, base station AUL configuration manager 1030, reference signal manager 1035, and AUL reception component 1040 are optional and separable from other features described with respect to base station communications manager 1015, base station AUL resource manager 1025, base station AUL configuration manager 1030, reference signal manager 1035, and AUL reception component 1040.

Base station AUL resource manager 1025 may identify multiple sets of AUL resources for a UE 115. In some cases, a number of resources in each set of beam-specific AUL resources is proportional to a traffic load on a corresponding AUL receive beam of the base station. Base station AUL configuration manager 1030 may determine an AUL configuration for the multiple sets of AUL resources and multiple AUL receive beams of the base station 105, where each of the multiple sets of AUL resources is specific to a respective AUL receive beam of the base station 105 and is associated with a reference signal. In some examples, base station AUL configuration manager 1030 may configure, in response to a request message, communications resources and a set of receive beams for communicating with the UE 115. In some cases, base station AUL configuration manager 1030 may reconfigure the multiple sets of beam-specific AUL resources and the respective AUL receive beams for the UE 115 based on a received measurement report. In some examples, the set of beam-specific resources is scheduled by a resource grant (e.g., an uplink grant) transmitted to the UE 115. In some cases, the multiple sets of beam-specific AUL resources are configured for a majority of receive beams (and, in some cases, every receive beam) of the base station 105. In some cases, the multiple sets of beam-specific AUL resources are configured for a subset of receive beams selected from the majority of the receive beams (and, in some cases, every receive beam) of the base station 105. In some examples, the AUL configuration may the transmitted to one or more UEs 115 via RRC messaging.

Reference signal manager 1035 may transmit multiple reference signals associated with the multiple sets of beam-specific AUL resources to the UE 115. In some cases, transmitting the multiple reference signals to the UE 115 includes transmitting the multiple reference signals to the UE 115 in accordance with a periodicity. In some cases, each of the multiple reference signals include a CSI-RS, or an SSB, or a combination thereof.

AUL reception component 1040 may receive an AUL transmission of uplink data from the UE 115 based on the multiple reference signals, where the AUL transmission is received using a first set of beam-specific AUL resources from the multiple sets of AUL resources. AUL reception component 1040 may also receive, from the UE 115, a second AUL transmission using a second set of beam-specific AUL resources from the multiple sets of AUL resources based on subsequent transmissions of the multiple reference signals. In some cases, receiving the AUL transmission of the uplink data includes receiving the AUL transmission of the uplink data from the UE 115 using the first set of beam-specific AUL resources and a second set of beam-specific AUL resources. That is, the AUL transmission may be simultaneously received on multiple sets of beam-specific AUL resources (and corresponding base station receive beams).

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
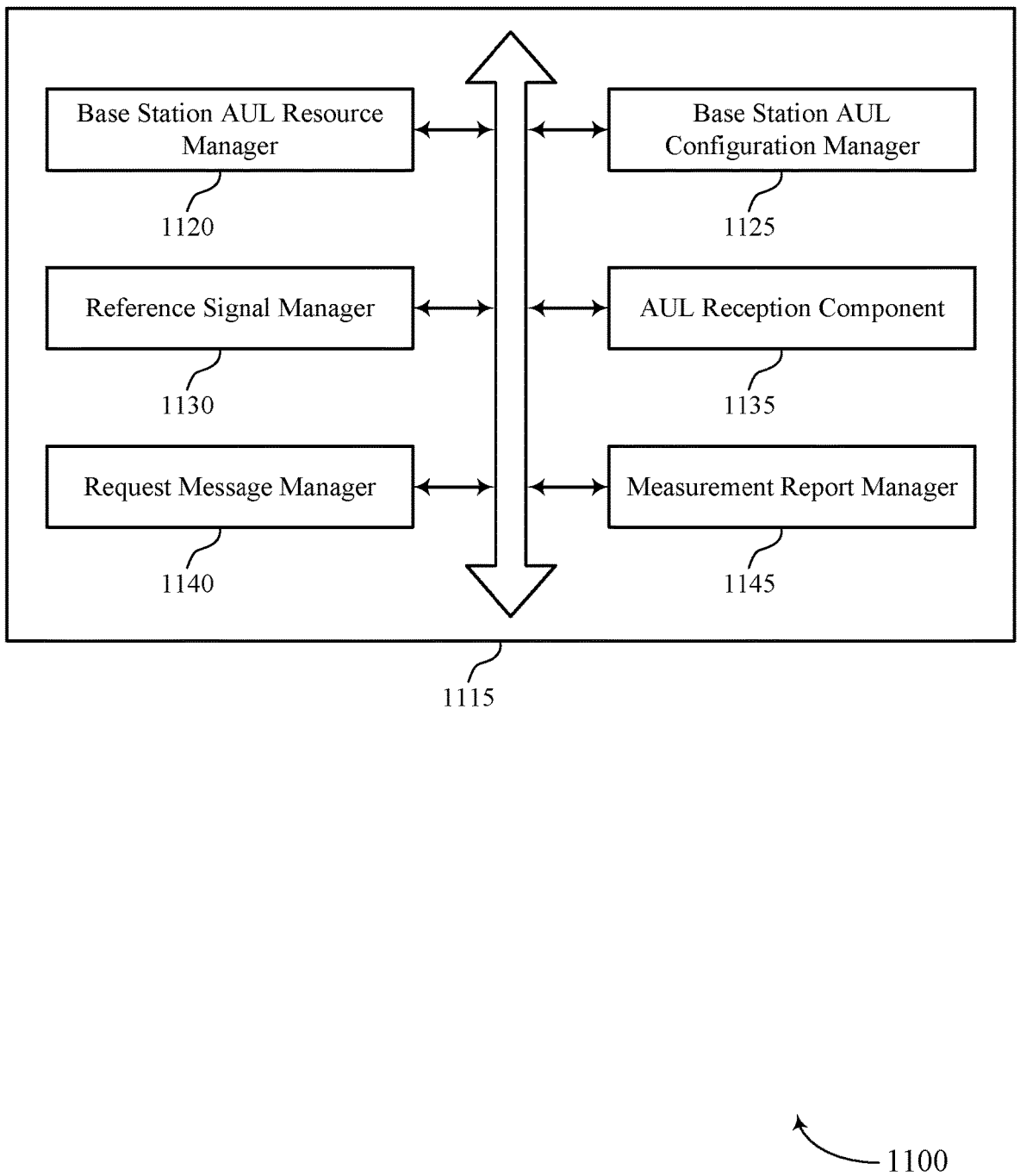

FIG. 11 shows a block diagram 1100 of a base station communications manager 1115 that supports beam management for AUL with analog beams in accordance with aspects of the present disclosure. The base station communications manager 1115 may be an example of aspects of a base station communications manager 1215 described with reference to FIGS. 9, 10, and 12. The base station communications manager 1115 may include base station AUL resource manager 1120, base station AUL configuration manager 1125, reference signal manager 1130, AUL reception component 1135, request message manager 1140, and measurement report manager 1145. Each of these modules may communicate, directly or indirectly, with one another (e.g., via one or more buses).

Base station AUL resource manager 1120 may identify multiple sets of AUL resources for a UE 115. In some cases, a number of resources in each set of beam-specific AUL resources is proportional to a traffic load on a corresponding AUL receive beam of the base station 105. Base station AUL configuration manager 1125 may determine an AUL configuration for the multiple sets of AUL resources and multiple AUL receive beams of the base station 105, where each of the multiple sets of AUL resources is specific to a respective AUL receive beam of the base station 105 and is associated with a reference signal. In some examples, base station AUL configuration manager 1125 may configure, in response to a request message, communications resources and a set of receive beams for communicating with the UE 115. In some cases, base station AUL configuration manager 1125 may reconfigure the multiple sets of beam-specific AUL resources and the respective AUL receive beams for the UE 115 based on a received measurement report. In some cases, the multiple sets of beam-specific AUL resources are configured for a majority of receive beams (and, in some cases, every receive beam) of the base station 105. In some cases, the multiple sets of beam-specific AUL resources are configured for a subset of receive beams selected from the majority of the receive beams (and, in some cases, every receive beam) of the base station 105.

Reference signal manager 1130 may transmit multiple reference signals associated with the multiple sets of beam-specific AUL resources to the UE 115. In some cases, transmitting the multiple reference signals to the UE 115 includes transmitting the multiple reference signals to the UE 115 in accordance with a periodicity. In some cases, each of the multiple reference signals include a CSI-RS, or an SSB, or a combination thereof.

AUL reception component 1135 may receive an AUL transmission of uplink data from the UE 115 based on the multiple reference signals, where the AUL transmission is received using a first set of beam-specific AUL resources from the multiple sets of AUL resources. In some cases, AUL reception component 1135 may receive, from the UE 115, a second AUL transmission using a second set of beam-specific AUL resources from the multiple sets of AUL resources based on subsequent transmissions of the multiple reference signals. In some cases, receiving the AUL transmission of the uplink data includes receiving the AUL transmission of the uplink data from the UE 115 using the first set of beam-specific AUL resources and a second set of beam-specific AUL resources.

Request message manager 1140 may receive a request message from the UE 115 based on subsequent transmissions of each of the multiple reference signals becoming undetectable by the UE 115. In some cases, the request message includes a RACH message. Measurement report manager 1145 may receive, from the UE 115, a measurement report including information obtained from measurements of the multiple reference signals, where the measurement report may be received using a set of beam-specific resources that is different from the first set of beam-specific AUL resources.

Figure 12:
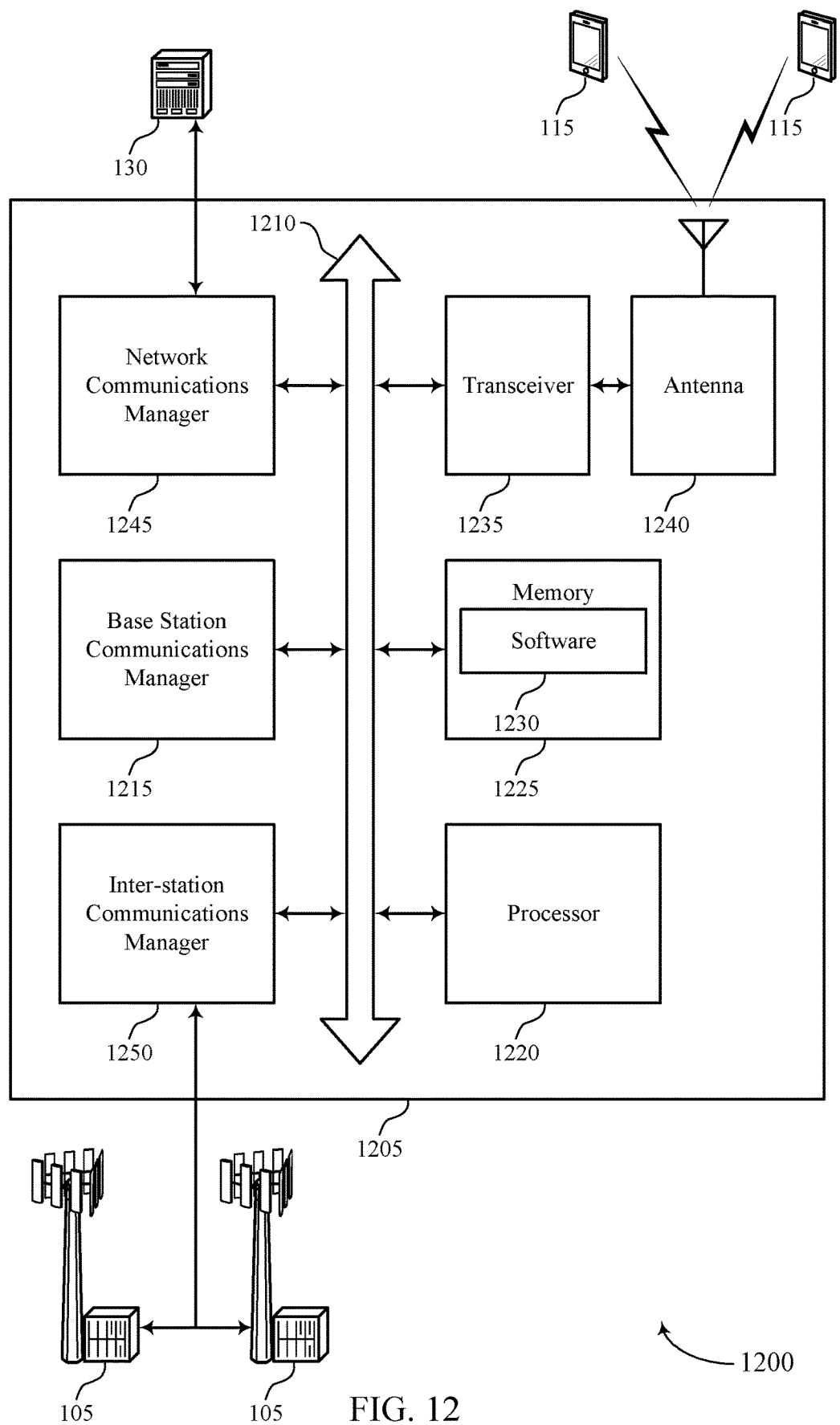
FIG. 12 illustrates a block diagram of a system including a base station that supports beam management for AUL with analog beams in accordance with aspects of the present disclosure.

FIG. 12 shows a diagram of a system 1200 including a device 1205 that supports beam management for AUL with analog beams in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting beam management for AUL with analog beams).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Figure 17:
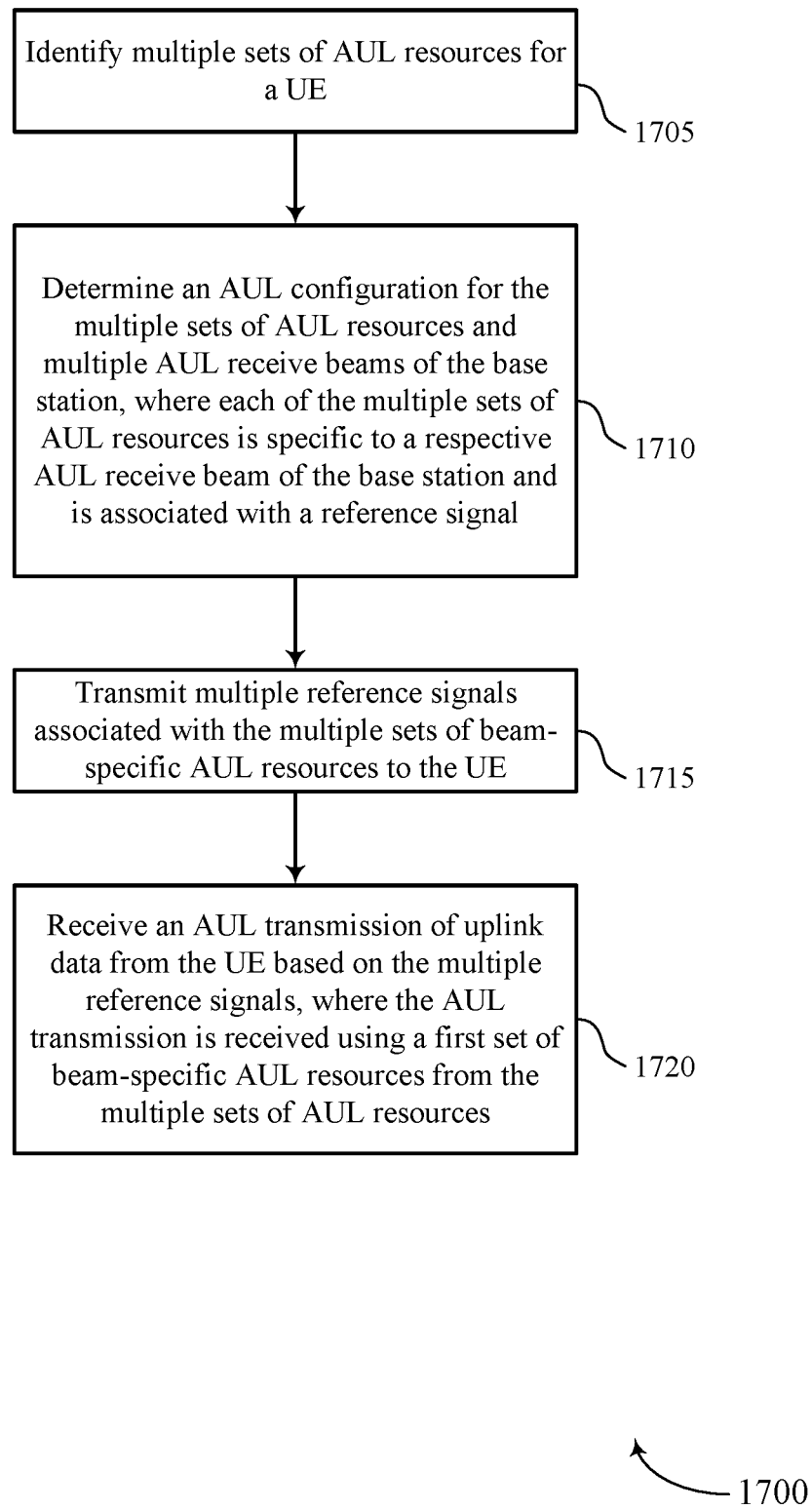
Figure 18:
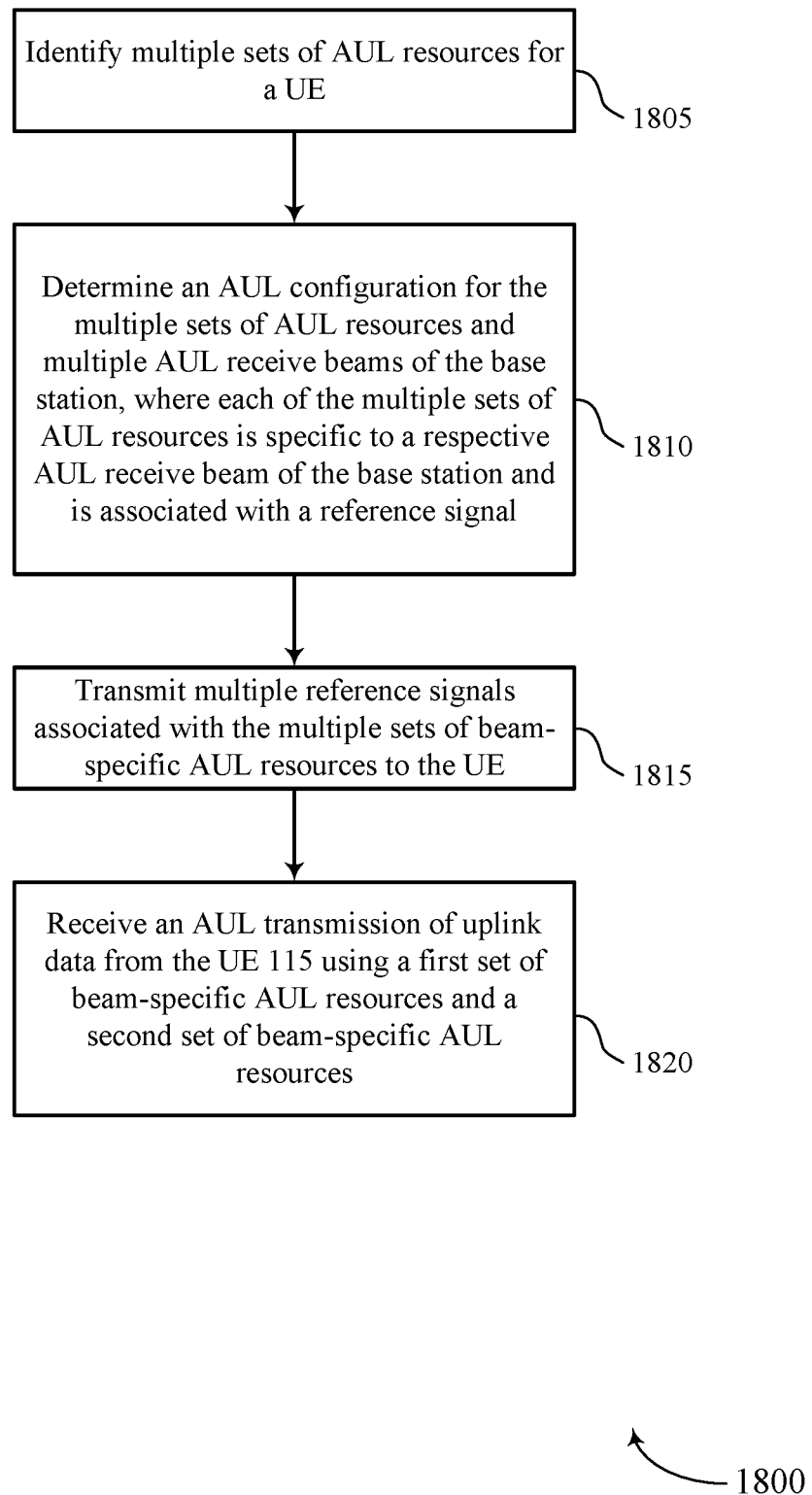

Software 1230 may include code to implement aspects of the present disclosure, including code to support beam management for AUL with analog beams such as described, for example, with reference to FIGS. 17-18. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
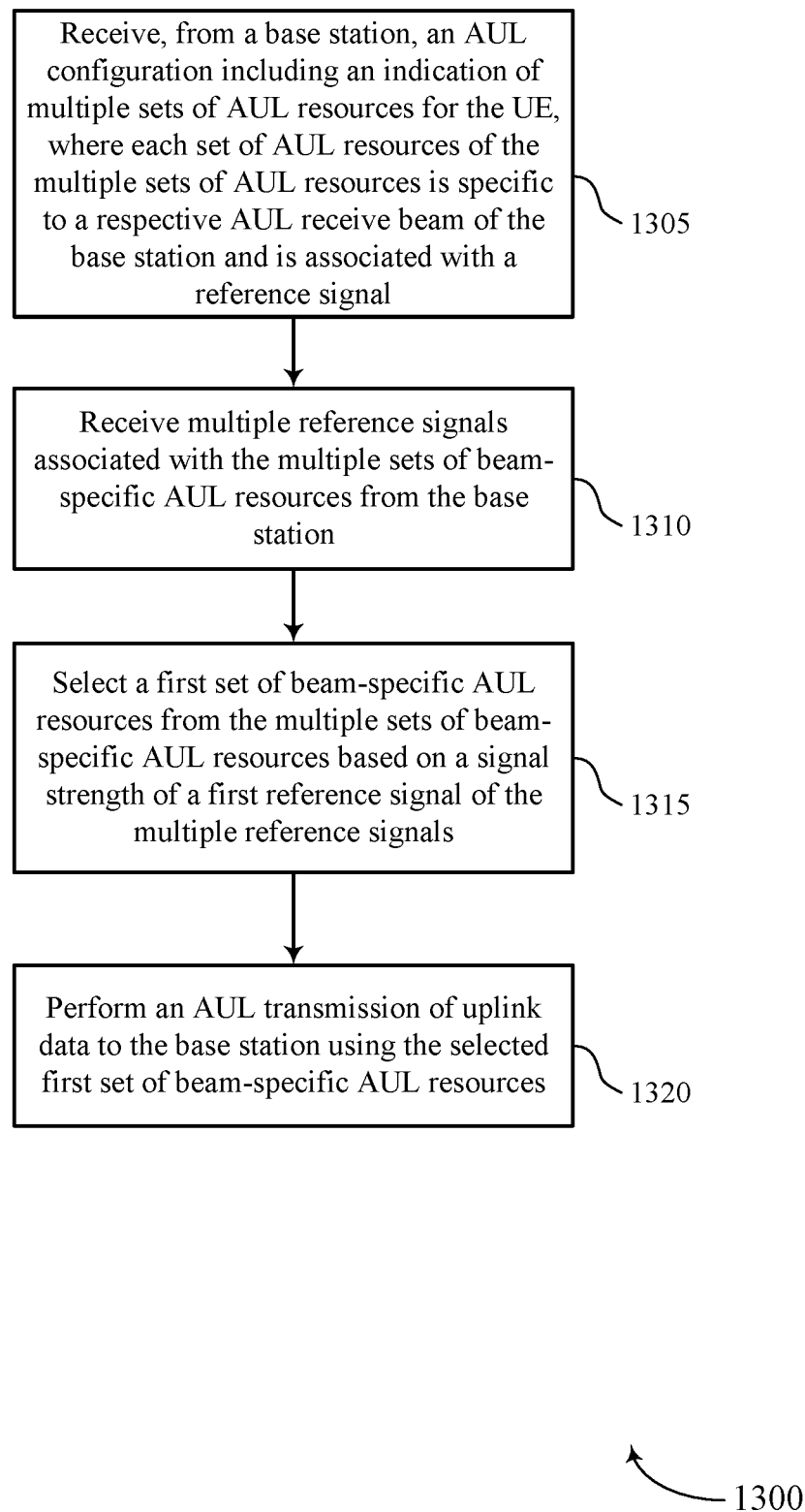
FIGS. 13 through 18 illustrate methods for beam management for AUL with analog beams in accordance with aspects of the present disclosure.

FIG. 13 shows a flowchart illustrating a method 1300 for beam management for AUL with analog beams in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive, from a base station 105, an AUL configuration comprising an indication of multiple sets of AUL resources for the UE 115, wherein each set of AUL resources of the multiple sets of AUL resources is specific to a respective AUL receive beam of the base station 105 and is associated with a reference signal. The operations of 1305 may be performed according to the methods described herein. In certain examples, aspects of the operations of 1305 may be performed by a UE AUL configuration manager as described with reference to FIGS. 5 through 8.

At 1310 the UE 115 may receive multiple reference signals associated with the multiple sets of beam-specific AUL resources from the base station 105. The operations of 1310 may be performed according to the methods described herein. In certain examples, aspects of the operations of 1310 may be performed by a reference signal component as described with reference to FIGS. 5 through 8.

At 1315 the UE 115 may select a first set of beam-specific AUL resources from the multiple sets of beam-specific AUL resources based at least in part on a signal strength of a first reference signal of the multiple reference signals. The operations of 1315 may be performed according to the methods described herein. In certain examples, aspects of the operations of 1315 may be performed by a AUL resource selection component as described with reference to FIGS. 5 through 8.

At 1320 the UE 115 may perform an AUL transmission of uplink data to the base station 105 using the selected first set of beam-specific AUL resources. The operations of 1320 may be performed according to the methods described herein. In certain examples, aspects of the operations of 1320 may be performed by a AUL transmission component as described with reference to FIGS. 5 through 8.

Figure 14:
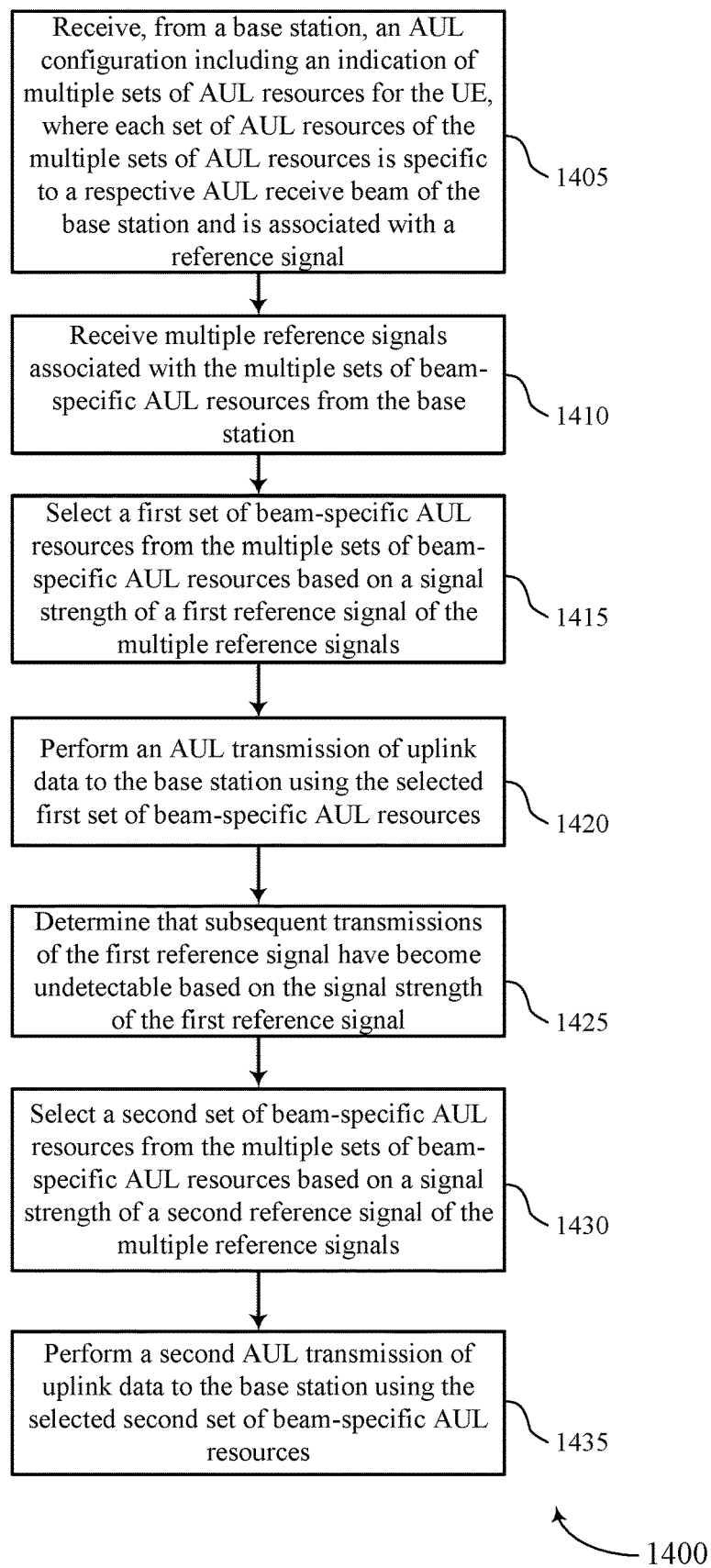

FIG. 14 shows a flowchart illustrating a method 1400 for beam management for AUL with analog beams in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive, from a base station 105, an AUL configuration comprising an indication of multiple sets of AUL resources for the UE 115, wherein each set of AUL resources of the multiple sets of AUL resources is specific to a respective AUL receive beam of the base station 105 and is associated with a reference signal. The operations of 1405 may be performed according to the methods described herein. In certain examples, aspects of the operations of 1405 may be performed by a UE AUL configuration manager as described with reference to FIGS. 5 through 8.

At 1410 the UE 115 may receive multiple reference signals associated with the multiple sets of beam-specific AUL resources from the base station 105. The operations of 1410 may be performed according to the methods described herein. In certain examples, aspects of the operations of 1410 may be performed by a reference signal component as described with reference to FIGS. 5 through 8.

At 1415 the UE 115 may select a first set of beam-specific AUL resources from the multiple sets of beam-specific AUL resources based at least in part on a signal strength of a first reference signal of the multiple reference signals. The operations of 1415 may be performed according to the methods described herein. In certain examples, aspects of the operations of 1415 may be performed by a AUL resource selection component as described with reference to FIGS. 5 through 8.

At 1420 the UE 115 may perform an AUL transmission of uplink data to the base station 105 using the selected first set of beam-specific AUL resources. The operations of 1420 may be performed according to the methods described herein. In certain examples, aspects of the operations of 1420 may be performed by a AUL transmission component as described with reference to FIGS. 5 through 8.

At 1425 the UE 115 may determine that subsequent transmissions of the first reference signal have become undetectable based at least in part on the signal strength of the first reference signal. The operations of 1425 may be performed according to the methods described herein. In certain examples, aspects of the operations of 1425 may be performed by a reference signal component as described with reference to FIGS. 5 through 8.

At 1430 the UE 115 may select a second set of beam-specific AUL resources from the multiple sets of beam-specific AUL resources based at least in part on a signal strength of a second reference signal of the multiple reference signals. The operations of 1430 may be performed according to the methods described herein. In certain examples, aspects of the operations of 1430 may be performed by a AUL resource selection component as described with reference to FIGS. 5 through 8.

At 1435 the UE 115 may perform a second AUL transmission of uplink data to the base station 105 using the selected second set of beam-specific AUL resources. The operations of 1435 may be performed according to the methods described herein. In certain examples, aspects of the operations of 1435 may be performed by a AUL transmission component as described with reference to FIGS. 5 through 8.

Figure 15:
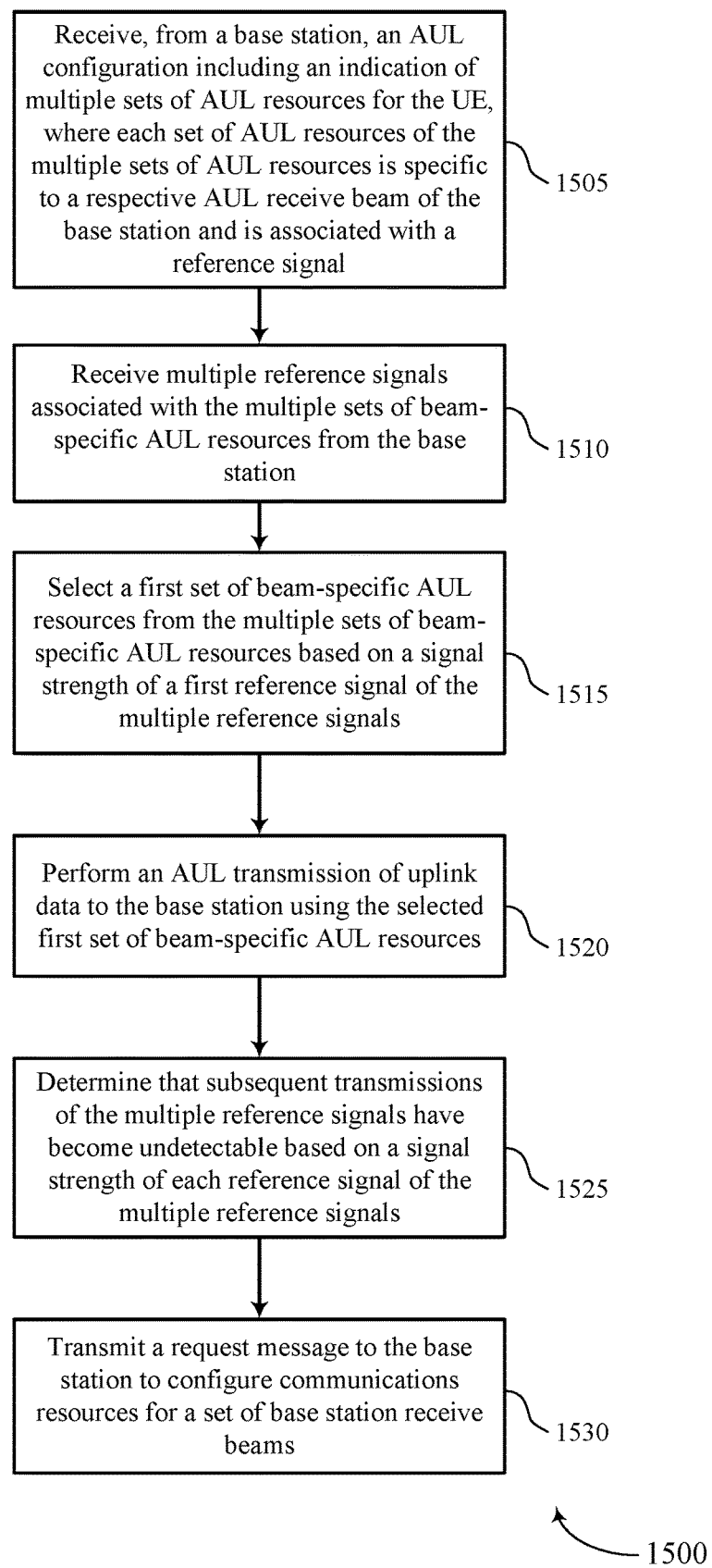

FIG. 15 shows a flowchart illustrating a method 1500 for beam management for AUL with analog beams in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive, from a base station 105, an AUL configuration comprising an indication of multiple sets of AUL resources for the UE 115, wherein each set of AUL resources of the multiple sets of AUL resources is specific to a respective AUL receive beam of the base station 105 and is associated with a reference signal. The operations of 1505 may be performed according to the methods described herein. In certain examples, aspects of the operations of 1505 may be performed by a UE AUL configuration manager as described with reference to FIGS. 5 through 8.

At 1510 the UE 115 may receive multiple reference signals associated with the multiple sets of beam-specific AUL resources from the base station 105. The operations of 1510 may be performed according to the methods described herein. In certain examples, aspects of the operations of 1510 may be performed by a reference signal component as described with reference to FIGS. 5 through 8.

At 1515 the UE 115 may select a first set of beam-specific AUL resources from the multiple sets of beam-specific AUL resources based at least in part on a signal strength of a first reference signal of the multiple reference signals. The operations of 1515 may be performed according to the methods described herein. In certain examples, aspects of the operations of 1515 may be performed by a AUL resource selection component as described with reference to FIGS. 5 through 8.

At 1520 the UE 115 may perform an AUL transmission of uplink data to the base station 105 using the selected first set of beam-specific AUL resources. The operations of 1520 may be performed according to the methods described herein. In certain examples, aspects of the operations of 1520 may be performed by a AUL transmission component as described with reference to FIGS. 5 through 8.

At 1525 the UE 115 may determine that subsequent transmissions of the multiple reference signals have become undetectable based at least in part on a signal strength of each reference signal of the multiple reference signals. The operations of 1525 may be performed according to the methods described herein. In certain examples, aspects of the operations of 1525 may be performed by a reference signal component as described with reference to FIGS. 5 through 8.

At 1530 the UE 115 may transmit a request message (e.g., a RACH message) to the base station 105 to configure communications resources for a set of base station 105 receive beams. The operations of 1530 may be performed according to the methods described herein. In certain examples, aspects of the operations of 1530 may be performed by a request message component as described with reference to FIGS. 5 through 8.

Figure 16:
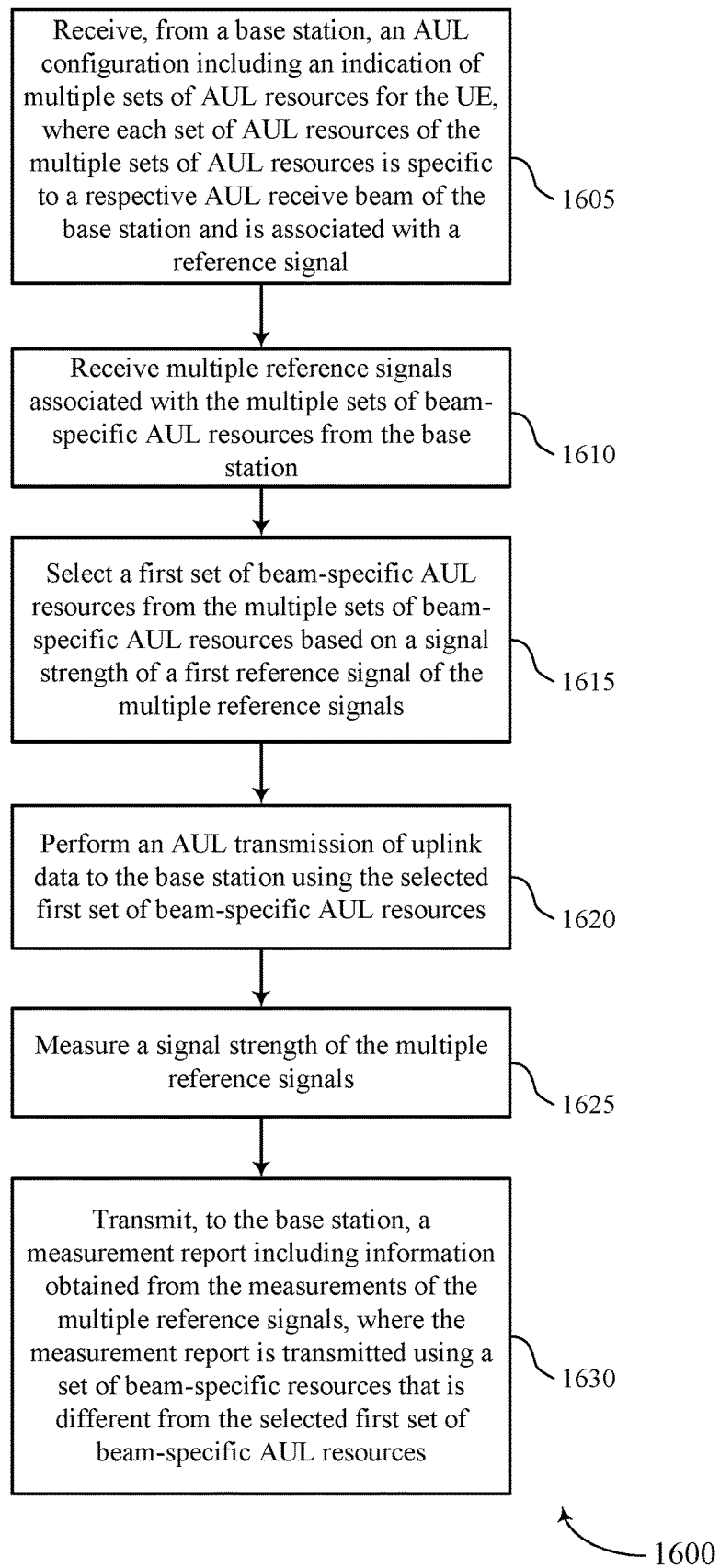

FIG. 16 shows a flowchart illustrating a method 1600 for beam management for AUL with analog beams in accordance with aspects of the present disclosure. The operations of method 1600 may be implemented by a UE 115 or its components as described herein. For example, the operations of method 1600 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive, from a base station 105, an AUL configuration comprising an indication of multiple sets of AUL resources for the UE 115, wherein each set of AUL resources of the multiple sets of AUL resources is specific to a respective AUL receive beam of the base station 105 and is associated with a reference signal. The operations of 1605 may be performed according to the methods described herein. In certain examples, aspects of the operations of 1605 may be performed by a UE AUL configuration manager as described with reference to FIGS. 5 through 8.

At 1610 the UE 115 may receive multiple reference signals associated with the multiple sets of beam-specific AUL resources from the base station 105. The operations of 1610 may be performed according to the methods described herein. In certain examples, aspects of the operations of 1610 may be performed by a reference signal component as described with reference to FIGS. 5 through 8.

At 1615 the UE 115 may select a first set of beam-specific AUL resources from the multiple sets of beam-specific AUL resources based at least in part on a signal strength of a first reference signal of the multiple reference signals. The operations of 1615 may be performed according to the methods described herein. In certain examples, aspects of the operations of 1615 may be performed by a AUL resource selection component as described with reference to FIGS. 5 through 8.

At 1620 the UE 115 may perform an AUL transmission of uplink data to the base station 105 using the selected first set of beam-specific AUL resources. The operations of 1620 may be performed according to the methods described herein. In certain examples, aspects of the operations of 1620 may be performed by a AUL transmission component as described with reference to FIGS. 5 through 8.

At 1625 the UE 115 may measure a signal strength of the multiple reference signals. The operations of 1625 may be performed according to the methods described herein. In certain examples, aspects of the operations of 1625 may be performed by a measurement component as described with reference to FIGS. 5 through 8.

At 1630 the UE 115 may transmit, to the base station 105, a measurement report comprising information obtained from the measurements of the multiple reference signals, wherein the measurement report is transmitted using a set of beam-specific resources that is different from the selected first set of beam-specific AUL resources. The operations of 1630 may be performed according to the methods described herein. In certain examples, aspects of the operations of 1630 may be performed by a measurement component as described with reference to FIGS. 5 through 8.

FIG. 17 shows a flowchart illustrating a method 1700 for beam management for AUL with analog beams in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may identify multiple sets of AUL resources for a UE 115. The operations of 1705 may be performed according to the methods described herein. In certain examples, aspects of the operations of 1705 may be performed by a base station AUL resource manager as described with reference to FIGS. 9 through 12.

At 1710 the base station 105 may determine an AUL configuration for the multiple sets of AUL resources and multiple AUL receive beams of the base station 105, wherein each of the multiple sets of AUL resources is specific to a respective AUL receive beam of the base station 105 and is associated with a reference signal. The operations of 1710 may be performed according to the methods described herein. In certain examples, aspects of the operations of 1710 may be performed by a base station AUL configuration manager as described with reference to FIGS. 9 through 12.

At 1715 the base station 105 may transmit multiple reference signals associated with the multiple sets of beam-specific AUL resources to the UE 115. The operations of 1715 may be performed according to the methods described herein. In certain examples, aspects of the operations of 1715 may be performed by a reference signal manager as described with reference to FIGS. 9 through 12.

At 1720 the base station 105 may receive an AUL transmission of uplink data from the UE 115 based at least in part on the multiple reference signals, wherein the AUL transmission is received using a first set of beam-specific AUL resources from the multiple sets of AUL resources. The operations of 1720 may be performed according to the methods described herein. In certain examples, aspects of the operations of 1720 may be performed by a AUL reception component as described with reference to FIGS. 9 through 12.

FIG. 18 shows a flowchart illustrating a method 1800 for beam management for AUL with analog beams in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may identify multiple sets of AUL resources for a UE 115. The operations of 1805 may be performed according to the methods described herein. In certain examples, aspects of the operations of 1805 may be performed by a base station AUL resource manager as described with reference to FIGS. 9 through 12.

At 1810 the base station 105 may determine an AUL configuration for the multiple sets of AUL resources and multiple AUL receive beams of the base station 105, wherein each of the multiple sets of AUL resources is specific to a respective AUL receive beam of the base station 105 and is associated with a reference signal. The operations of 1810 may be performed according to the methods described herein. In certain examples, aspects of the operations of 1810 may be performed by a base station AUL configuration manager as described with reference to FIGS. 9 through 12.

At 1815 the base station 105 may transmit multiple reference signals associated with the multiple sets of beam-specific AUL resources to the UE 115. The operations of 1815 may be performed according to the methods described herein. In certain examples, aspects of the operations of 1815 may be performed by a reference signal manager as described with reference to FIGS. 9 through 12.

At 1820 the base station 105 may receive an AUL transmission of uplink data from the UE 115 using a first set of beam-specific AUL resources and a second set of beam-specific AUL resources. The operations of 1820 may be performed according to the methods described herein. In certain examples, aspects of the operations of 1820 may be performed by a AUL reception component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a base station, an autonomous uplink (AUL) configuration comprising an indication of multiple sets of AUL resources for the UE, wherein each set of AUL resources of the multiple sets of AUL resources is specific to a respective AUL receive beam of the base station and is associated with a reference signal;
    receiving multiple reference signals associated with the multiple sets of AUL resources from the base station, the multiple reference signals comprising a first reference signal associated with a first set of beam-specific AUL resources and a second reference signal associated with a second set of beam-specific AUL resources;
    measuring one or more signal strengths of the multiple reference signals;
    selecting the first set of beam-specific AUL resources from the multiple sets of AUL resources based at least in part on a signal strength of the first reference signal of the multiple reference signals;
    transmitting, to the base station using the second set of beam-specific AUL resources from the multiple sets of AUL resources, a measurement report comprising information obtained from measurements of the multiple reference signals, wherein the second set of beam-specific resources is different from the selected first set of beam-specific AUL resources, and wherein the measurement report is transmitted upon a signal strength of the second reference signal becoming larger than the signal strength of the first reference signal by a threshold amount; and
    performing an AUL transmission of uplink data to the base station using the selected first set of beam-specific AUL resources.

2. The method of claim 1, further comprising:
    determining that subsequent transmissions of the first reference signal have become undetectable based at least in part on the signal strength of the first reference signal;
    selecting the second set of beam-specific AUL resources from the multiple sets of AUL resources based at least in part on the signal strength of a second reference signal of the multiple reference signals; and performing a second AUL transmission of uplink data to the base station using the selected second set of beam-specific AUL resources.

3. The method of claim 1, further comprising:
determining that subsequent transmissions of the multiple reference signals have become undetectable based at least in part on a signal strength of each reference signal of the multiple reference signals; and
transmitting a request message to the base station to configure communications resources for a set of base station receive beams.

4. The method of claim 3, wherein the request message comprises a random access channel (RACH) message.

5. The method of claim 1, further comprising:
comparing the signal strength of the first reference signal with the signal strength of the second reference signal of the multiple reference signals, wherein selecting the first set of beam-specific AUL resources is based at least in part on the comparing.

6. The method of claim 1, further comprising:
selecting the second set of beam-specific AUL resources from the multiple sets of AUL resources based at least in part on the signal strength of a second reference signal of the multiple reference signals, wherein performing the AUL transmission of the uplink data comprises:
performing the AUL transmission of the uplink data using the selected first set of beam-specific AUL resources and the selected second set of beam-specific AUL resources.

7. The method of claim 1, wherein selecting the first set of beam-specific AUL resources comprises:
determining that the signal strength of the first reference signal satisfies a second threshold; and
selecting the first set of beam-specific AUL resources based at least in part on the determining that the signal strength of the first reference signal satisfies the second threshold.

8. The method of claim 1, wherein the multiple sets of AUL resources are configured for a majority of receive beams of the base station.

9. The method of claim 1, wherein the multiple sets of AUL resources are configured for a subset of receive beams selected from a majority of receive beams of the base station.

10. The method of claim 1, wherein each of the multiple reference signals comprise a channel state information reference signal (CSI-RS), or a synchronization signal burst (SSB), or a combination thereof.

11. A method for wireless communication at a base station, comprising:
identifying multiple sets of autonomous uplink (AUL) resources for a user equipment (UE);
determining an AUL configuration for the multiple sets of AUL resources and multiple AUL receive beams of the base station, wherein each of the multiple sets of AUL resources is specific to a respective AUL receive beam of the base station and is associated with a reference signal;
transmitting multiple reference signals associated with the multiple sets of AUL resources to the UE, the multiple reference signals comprising a first reference signal associated with a first set of beam-specific AUL resources and a second reference signal associated with a second set of beam-specific AUL resources;
receiving an AUL transmission of uplink data from the UE based at least in part on the multiple reference signals, wherein the AUL transmission is received using the first set of beam-specific AUL resources from the multiple sets of AUL resources; and
receiving, from the UE using the second set of beam-specific AUL resources from the multiple sets of AUL resources, a measurement report comprising information obtained from measurements of the multiple reference signals, wherein the second set of beam-specific resources is different from the first set of beam-specific AUL resources, and wherein the measurement report indicates that a signal strength of the second reference signal became larger than a signal strength of the first reference signal by a threshold amount.

12. The method of claim 11, further comprising:
receiving, from the UE, a second AUL transmission using the second set of beam-specific AUL resources from the multiple sets of AUL resources based at least in part on subsequent transmissions of the multiple reference signals.

13. The method of claim 11, further comprising:
receiving a request message from the UE based at least in part on subsequent transmissions of each of the multiple reference signals becoming undetectable by the UE; and
configuring, in response to the request message, communications resources and a set of receive beams for communicating with the UE.

14. The method of claim 13, wherein the request message comprises a random access channel (RACH) message.

15. The method of claim 11, wherein transmitting the multiple reference signals to the UE comprises:
transmitting the multiple reference signals to the UE in accordance with a periodicity.

16. The method of claim 11, further comprising:
reconfiguring the multiple sets of AUL resources and the respective AUL receive beams for the UE based at least in part on the received measurement report.

17. The method of claim 11, wherein receiving the AUL transmission of the uplink data comprises:
receiving the AUL transmission of the uplink data from the UE using the first set of beam-specific AUL resources and the second set of beam-specific AUL resources.

18. The method of claim 11, wherein the multiple sets of AUL resources are configured for a majority of receive beams of the base station.

19. The method of claim 11, wherein the multiple sets of AUL resources are configured for a subset of receive beams selected from a majority of receive beams of the base station.

20. The method of claim 11, wherein a number of resources in each set of beam-specific AUL resources is proportional to a traffic load on a corresponding AUL receive beam of the base station.

21. An apparatus for wireless communication, comprising:
a processor;
memory in electronic communication with the processor; and
instructions stored in the memory and executable by the processor to cause the apparatus to:
receive, from a base station, an autonomous uplink (AUL) configuration comprising an indication of multiple sets of AUL resources for a user equipment (UE), wherein each set of AUL resources of the multiple sets of AUL resources is specific to a respective AUL receive beam of the base station and is associated with a reference signal;

receive multiple reference signals associated with the multiple sets of AUL resources from the base station, the multiple reference signals comprising a first reference signal associated with a first set of beam-specific AUL resources and a second reference signal associated with a second set of beam-specific AUL resources;

measure one or more signal strengths of the multiple reference signals;

select the first set of beam-specific AUL resources from the multiple sets of AUL resources based at least in part on a signal strength of the first reference signal of the multiple reference signals;

transmit, to the base station using the second set of beam-specific AUL resources from the multiple sets of AUL resources, a measurement report comprising information obtained from measurements of the multiple reference signals, wherein the second set of beam-specific resources is different from the selected first set of beam-specific AUL resources, and wherein the measurement report is transmitted upon a signal strength of the second reference signal becoming larger than the signal strength of the first reference signal by a threshold amount; and perform an AUL transmission of uplink data to the base station using the selected first set of beam-specific AUL resources.

22. The apparatus of claim 21, wherein the instructions are further executable by the processor to cause the apparatus to:

determine that subsequent transmissions of the first reference signal have become undetectable based at least in part on the signal strength of the first reference signal;

select the second set of beam-specific AUL resources from the multiple sets of AUL resources based at least in part on the signal strength of a second reference signal of the multiple reference signals; and perform a second AUL transmission of uplink data to the base station using the selected second set of beam-specific AUL resources.

23. The apparatus of claim 21, wherein the instructions are further executable by the processor to cause the apparatus to:

determine that subsequent transmissions of the multiple reference signals have become undetectable based at least in part on a signal strength of each reference signal of the multiple reference signals; and transmit a request message to the base station to configure communications resources for a set of base station receive beams.

24. An apparatus for wireless communication, comprising:

a processor;

memory in electronic communication with the processor; and instructions stored in the memory and executable by the processor to cause the apparatus to:

identify multiple sets of autonomous uplink (AUL) resources for a user equipment (UE);

determine an AUL configuration for the multiple sets of AUL resources and multiple AUL receive beams of a base station, wherein each of the multiple sets of AUL resources is specific to a respective AUL receive beam of the base station and is associated with a reference signal;

transmit multiple reference signals associated with the multiple sets of AUL resources to the UE, the multiple reference signals comprising a first reference signal associated with a first set of beam-specific AUL resources and a second reference signal associated with a second set of beam-specific AUL resources;

receive an AUL transmission of uplink data from the UE based at least in part on the multiple reference signals, wherein the AUL transmission is received using the first set of beam-specific AUL resources from the multiple sets of AUL resources; and receive, from the UE using the second set of beam-specific AUL resources from the multiple sets of AUL resources, a measurement report comprising information obtained from measurements of the multiple reference signals, wherein the second set of beam-specific resources is different from the first set of beam-specific AUL resources, and wherein the measurement report indicates that a signal strength of the second reference signal became larger than a signal strength of the first reference signal by a threshold amount.

25. The apparatus of claim 24, wherein the instructions are further executable by the processor to cause the apparatus to:

receive, from the UE, a second AUL transmission using the second set of beam-specific AUL resources from the multiple sets of AUL resources based at least in part on subsequent transmissions of the multiple reference signals.

26. The apparatus of claim 24, wherein the instructions are further executable by the processor to cause the apparatus to:

receive a request message from the UE based at least in part on subsequent transmissions of each of the multiple reference signals becoming undetectable by the UE; and configure, in response to the request message, communications resources and a set of receive beams for communicating with the UE.

* * * * *